United States Patent
Safai

(10) Patent No.: US 6,715,003 B1
(45) Date of Patent: Mar. 30, 2004

(54) DIGITAL CAMERA AND METHOD FOR COMMUNICATING DIGITAL IMAGE AND AT LEAST ONE ADDRESS IMAGE STORED IN THE CAMERA TO A REMOTELY LOCATED SERVICE PROVIDER

(75) Inventor: Mohammad A. Safai, Los Altos, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/504,825

(22) Filed: Feb. 14, 2000

Related U.S. Application Data

(63) Continuation-in-part of application No. 09/081,491, filed on May 18, 1998.

(51) Int. Cl.⁷ .......................... G06F 13/14; H04N 5/232
(52) U.S. Cl. ................. 710/33; 348/207.99; 348/211.3; 348/231.2
(58) Field of Search ........................ 710/3, 8, 33, 62; 709/217, 234, 204; 348/207.99, 207.1, 207.2, 211.1, 211.2, 211.3, 231.1, 231.2, 333

(56) References Cited

U.S. PATENT DOCUMENTS

| | | |
|---|---|---|
| 3,744,390 A | 7/1973 | Clark |
| 3,820,133 A | 6/1974 | Adorney et al. |
| 3,852,602 A | 12/1974 | Gramm et al. |
| 3,864,708 A | 2/1975 | Allen |
| 3,974,329 A | 8/1976 | Zenzefilis |
| 4,005,261 A | 1/1977 | Sato et al. |
| 4,013,876 A | 3/1977 | Anstin |
| 4,092,654 A | 5/1978 | Alasia |
| 4,097,893 A | 6/1978 | Camras |
| 4,423,934 A | 1/1984 | Lambeth et al. |
| 4,544,960 A | 10/1985 | Konishi |
| 4,546,380 A | 10/1985 | Knop |
| 4,587,633 A | 5/1986 | Wang et al. |
| 4,591,900 A | 5/1986 | Heeb et al. |
| 4,713,686 A | 12/1987 | Ozaki et al. |
| 4,811,043 A | 3/1989 | Ishimura et al. |
| 4,819,059 A | 4/1989 | Pape |
| 4,827,347 A | 5/1989 | Bell |
| 4,833,533 A | 5/1989 | Augusti et al. |
| 4,985,911 A | 1/1991 | Emmons et al. |
| 5,021,811 A | 6/1991 | Maurinus et al. |
| 5,062,136 A | 10/1991 | Gattis et al. |

(List continued on next page.)

FOREIGN PATENT DOCUMENTS

| JP | 09116719 A | * | 5/1997 | ............ H04N/1/32 |
| JP | 11027313 A | * | 1/1999 | |

OTHER PUBLICATIONS

W. Knox Richardson—"Press Release: FotoWire(R) Internet Digital Photo Print Service"—Apr. 21, 1999—Newsgroups: rec.photo.digital.*

Primary Examiner—Thomas Lee
Assistant Examiner—Thuan Du

(57) ABSTRACT

A photo service provider provides remote developing, printing, and delivery of photographic prints of digital images. In one embodiment, a handheld digital camera can send to the photo service provider one or more digital images with address information (e.g., one or more address image created in the camera) indicating destinations for the digital images or photographic prints. One or more additional images or instructions associated with the delivery addresses can indicate the size or quantity of the prints to be delivered. The camera can be coupled to a data communication network through which the camera directly sends the selected images to the photo service provider. At a server of the service provider, one or more photographic prints of the selected images are automatically printed, packaged, and sent to the delivery addresses.

39 Claims, 31 Drawing Sheets

U.S. PATENT DOCUMENTS

| | | | |
|---|---|---|---|
| 5,164,831 | A | 11/1992 | Kuchta et al. |
| 5,164,982 | A | 11/1992 | Davis |
| 5,185,671 | A | 2/1993 | Lieberman et al. |
| 5,202,767 | A | 4/1993 | Dozier et al. |
| 5,264,935 | A | 11/1993 | Nakajima |
| 5,264,944 | A | 11/1993 | Takemura |
| 5,282,025 | A | 1/1994 | Sato |
| 5,402,170 | A | 3/1995 | Parulski et al. |
| 5,438,359 | A | 8/1995 | Aoki |
| 5,440,699 | A | 8/1995 | Farrand et al. |
| 5,466,560 | A | 11/1995 | Sowinski et al. |
| 5,471,383 | A | 11/1995 | Gobush et al. |
| 5,477,264 | A | 12/1995 | Sarbadhikari et al. |
| 5,485,370 | A | 1/1996 | Moss et al. |
| 5,499,294 | A | 3/1996 | Friedman |
| 5,500,700 | A | 3/1996 | Massarsky |
| 5,517,265 | A | 5/1996 | Zander et al. |
| 5,525,957 | A | 6/1996 | Tanaka |
| 5,526,046 | A | 6/1996 | Kondo |
| 5,541,653 | A | 7/1996 | Peters et al. |
| 5,541,656 | A | 7/1996 | Kare et al. |
| 5,546,194 | A | 8/1996 | Ross |
| 5,555,464 | A | 9/1996 | Hatlestad |
| 5,576,757 | A | 11/1996 | Roberts et al. |
| 5,581,299 | A | 12/1996 | Raney |
| 5,587,928 | A | 12/1996 | Jones et al. |
| 5,606,365 | A | 2/1997 | Maurinus et al. |
| 5,659,323 | A | 8/1997 | Taylor |
| 5,666,159 | A | 9/1997 | Parulski et al. |
| 5,682,441 | A | 10/1997 | Ligtenberg et al. |
| 5,696,560 | A | 12/1997 | Songer |
| 5,696,850 | A | 12/1997 | Parulski et al. |
| 5,706,097 | A | 1/1998 | Schelling et al. |
| 5,706,457 | A | 1/1998 | Dwyer et al. |
| 5,708,856 | A | 1/1998 | Cloutier |
| 5,710,834 | A | 1/1998 | Rhoads |
| 5,719,987 | A | 2/1998 | Kawamura et al. |
| 5,737,491 | A | 4/1998 | Allen et al. |
| 5,754,227 | A * | 5/1998 | Fukuoka ............... 348/232 |
| 5,806,005 | A | 9/1998 | Hull et al. |
| 5,812,736 | A | 9/1998 | Anderson |
| 5,815,201 | A | 9/1998 | Hashimoto et al. |
| 5,815,205 | A | 9/1998 | Hashimoto et al. |
| 5,864,651 | A | 1/1999 | Lavie et al. |
| 5,898,779 | A | 4/1999 | Squilla et al. |
| 5,903,309 | A | 5/1999 | Anderson |
| 5,923,908 | A | 7/1999 | Schrock et al. |
| 5,943,603 | A | 8/1999 | Parulski et al. |
| 5,978,016 | A * | 11/1999 | Lourette et al. ............... 348/64 |
| 6,005,613 | A | 12/1999 | Endsley et al. |
| 6,337,712 | B1 * | 1/2002 | Shiota et al. ............... 348/231 |
| 6,396,537 | B1 * | 5/2002 | Squilla et al. ............... 348/239 |

* cited by examiner

DIGITAL CAMERA AND METHOD FOR COMMUNICATING DIGITAL IMAGE AND AT LEAST ONE ADDRESS IMAGE STORED IN THE CAMERA TO A REMOTELY LOCATED SERVICE PROVIDER

RELATED APPLICATION

This application is a continuation-in-part of U.S. patent application Ser. No. 09/081,491, filed May 18, 1998, entitled "Transporting Digital Images," and naming as inventors Mohammad A. Safai and Eugene Wang.

This application is related to Application Ser. No. 09/503,984, filed Feb. 14, 2000, entitled "REMOTE DIGITAL IMAGE PRINTING AND INTERFACE FOR A DIGITAL CAMERA," and naming as inventors MOHAMMAD A. SAFAI, DOUGLAS W. L. TEEPLE, EUGENE WANG.

FIELD OF THE INVENTION

The present invention generally relates to data processing. The invention relates more specifically to automatic remote development, printing, and forwarding of photographic prints based on digital images that are formed in a digital camera.

BACKGROUND OF THE INVENTION

People around the world enjoy photography and distributing photographic prints to their friends, relatives, and neighbors. Photography is also important in a variety of commercial industries. Recently, a new generation of cameras has become available that form images using digital technology. Personal electronic handheld digital cameras are now commercially available from Nikon, Canon, and other manufacturers.

In a personal electronic handheld digital camera, light reflected from a subject passes through a lens and strikes a digitizing device, such as a charge-coupled device (CCD) detector. The CCD detector, and associated circuitry, converts light rays into digital electronic signals that form an image of the subject. One or more digital images are stored in a solid-state memory device within the camera or in a removable memory device such as a flash memory card. The camera contains a microprocessor that executes the image formation and storage operations, under control of a computer program embodied in firmware such as read-only memory.

A display integral to the camera, such as a liquid-crystal display (LCD), provides a viewfinder function by showing images formed by the lens and CCD prior to storage. The display also shows status information about various camera settings.

After a picture-taking session, a user of the camera connects the camera to a workstation or personal computer. Alternatively, the user removes the removable storage device that contains stored images from the camera, and connects the removable storage device to the personal computer. The personal computer executes a program that can read the stored images, from either the camera or the removable storage device, and display the images on a display of the personal computer. Under software control, the personal computer can also send one or more images to a printer, store the images as files on the personal computer, and carry out other functions.

One problem of this approach is that a user of the digital camera is required to use the personal computer to obtain a reasonable display of the digital images. Generally, personal computers have displays that are far larger and have far better resolution and image quality than the small LCD displays typically found on digital handheld cameras. As a result, using a personal computer is the only practical way to obtain a useful displayed image of a digital image taken with a digital camera.

Another disadvantage of the prior approach is that a personal computer or its equivalent is required to print a tangible copy of a digital image taken with a digital camera; the camera cannot produce a printed copy itself. Further, most consumers do not own or cannot afford a high-resolution color printer, such as a laser or ink jet printer, that is capable of producing a high-quality printed image of a digital photo. Consumer-grade computer printers can produce a good-quality grayscale image or black-and-white image, but high-resolution color printers are expensive and not common in the home computer environment.

As an alternative, a user of a digital camera can take the removable storage device to a commercial image printing service. Conventional photo developers are beginning to offer such services. The user pays a fee to the service provider, and the service provider prints a hard-copy print of an image, generally using a high-resolution color laser printer and ordinary paper. However, this involves delay and fees that are undesirable. In particular, in this alternative, when a user of the camera wishes to send a tangible copy of an image to a relative, friend, or neighbor, the user is required to wait for the service provider to print the image and deliver it to the user, before the user can send the print to the desired person. There is a need to expedite the image transport process.

A further problem with the prior approaches is that the user of the camera is required to use a personal computer to send a digital image made with the camera to a distant business, friend, relative or neighbor. Personal computers are not ubiquitous on a worldwide basis or even in large cities, outside highly industrialized nations such as the United States. Thus, there are millions of people who enjoy taking pictures but do not have access to, cannot afford, or do not want to use a personal computer in order to send a picture to someone else. For these people, there is an acute need to simplify and expedite the process of sending pictures from themselves to someone else.

Another problem with these approaches is that the user or owner of the digital camera cannot prepare a photographic print from a digital image, on standard photographic paper of the type used in optical and chemical photographic processes. Making photographic prints from digital images is desirable for several reasons. For example, in general, because photographic paper is more color-sensitive and has extremely fine grain, a photographic print will have greater image fidelity and color quality than an image printed on a laser printer. In addition, laser printed or ink jet images may be unsuitable for reproduction in newspapers, magazines and other media. Furthermore, because color laser printing is a new technology and the long-term durability of inkjet inks and papers is unknown, images printed on conventional plain paper have an uncertain life span. In contrast, photographic prints are durable and are known to last many years, and are therefore desirable for archival applications.

Currently, an owner of a digital camera who desires to make photographic prints must take the camera, or a diskette containing images taken by the camera, to a commercial photo developer or camera shop. The diskette is given to the developer, or the images are transferred from the camera to a storage device associated with the developer. The owner of the digital camera then generally leaves the premises while the photographic prints are made, because the photo printing process takes time and may involve slow chemical processing. Thus, the owner of the camera is requested to return at a later time to pick up and pay for the prints. If the prints are to be given to another person or business entity, the owner of the camera must separately deliver the prints to that individual or entity. The foregoing process takes time and requires multiple manual steps and an associated expenditure of energy and resources.

Accordingly, there is an acute need in this field for a more automatic way to transfer digital images to a developer or other entity that can prepare photographic prints. There is also a need for a more automatic way to deliver the completed photographic prints to the intended recipient without requiring multiple visits or trips by the camera owner to the developer.

SUMMARY OF THE INVENTION

According to one aspect of the invention, a method of preparing a photographic print is provided. A digital image is formed in a digital camera. One or more address images are retrieved. The digital image and the one or more address images are communicated from the digital camera over one or more networks to a service provider that is remote from the digital camera and coupled to one of the networks. A photographic print of the digital image is printed on a photographic printer associated with the service provider. The photographic print is delivered from the service provider to one or more receiving parties specified by the one or more address images.

According to another aspect of the invention, a method is provided for preparing a photographic print. A digital image is formed using a digital camera. Address information is stored in the digital camera in association with the image. The address information specifies one or more recipients of the digital image and defines characteristics of the photographic print. Both the digital image and the address information are communicated over a packet-switched data network to a service provider that is logically remote from the digital camera and communicatively coupled to the data network. A photographic print is printed from the digital image based on the characteristics. Finally, the photographic print is delivered from the service provider to the one or more recipients specified by the address information.

According to another aspect of the invention a digital camera is provided that is configured to form a digital image and retrieve one or more address images. The digital camera is further configured to communicate the digital image and the one or more address images from the digital camera over one or more networks to a service provider that is remote from the digital camera and coupled to one of the networks.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

A method and apparatus for automatic remote developing, printing, and forwarding of photographic prints based on digital images that are formed in a digital camera is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW OF DIGITAL CAMERA ARCHITECTURE

Figure 1:
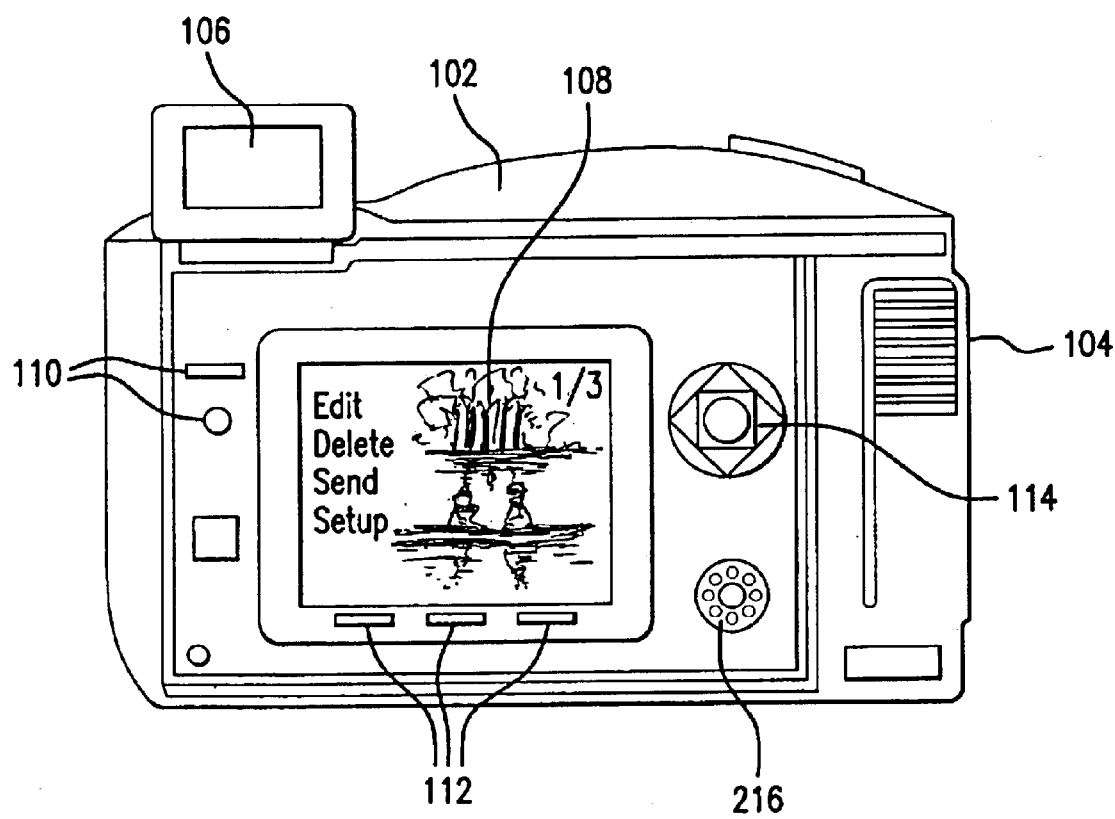
FIG. 1 is a rear elevation view of a handheld digital camera.

FIG. 1 is a rear elevation view of a personal handheld digital camera 100. The camera 100 comprises a body 102 generally formed as a rectangular box that can be gripped in the hand using a handgrip 104. A viewfinder 106 is optically coupled to a main lens (not shown), so that a user of the camera who wishes to take a picture can look through the viewfinder 106 to line up a shot.

A display device 108 is mounted in the body 102. Stored images, camera settings, and other indicators may be viewed on the display device 108. In one embodiment, the display device 108 is a liquid crystal display (LCD) having a visible area that is approximately 2" (5 cm) in the diagonal dimension. Selection buttons 110, 112, and 114 are mounted in the body 102 adjacent to the display device 108. The selection buttons 110, 112, 114 are used to signal various logical selections of options, commands, etc. based on the contents of the display device 108. Use of the selection buttons 110, 112, 114 in the context of transporting digital images is described further below. A microphone 216 is additionally included in the digital camera 100.

Figure 2:
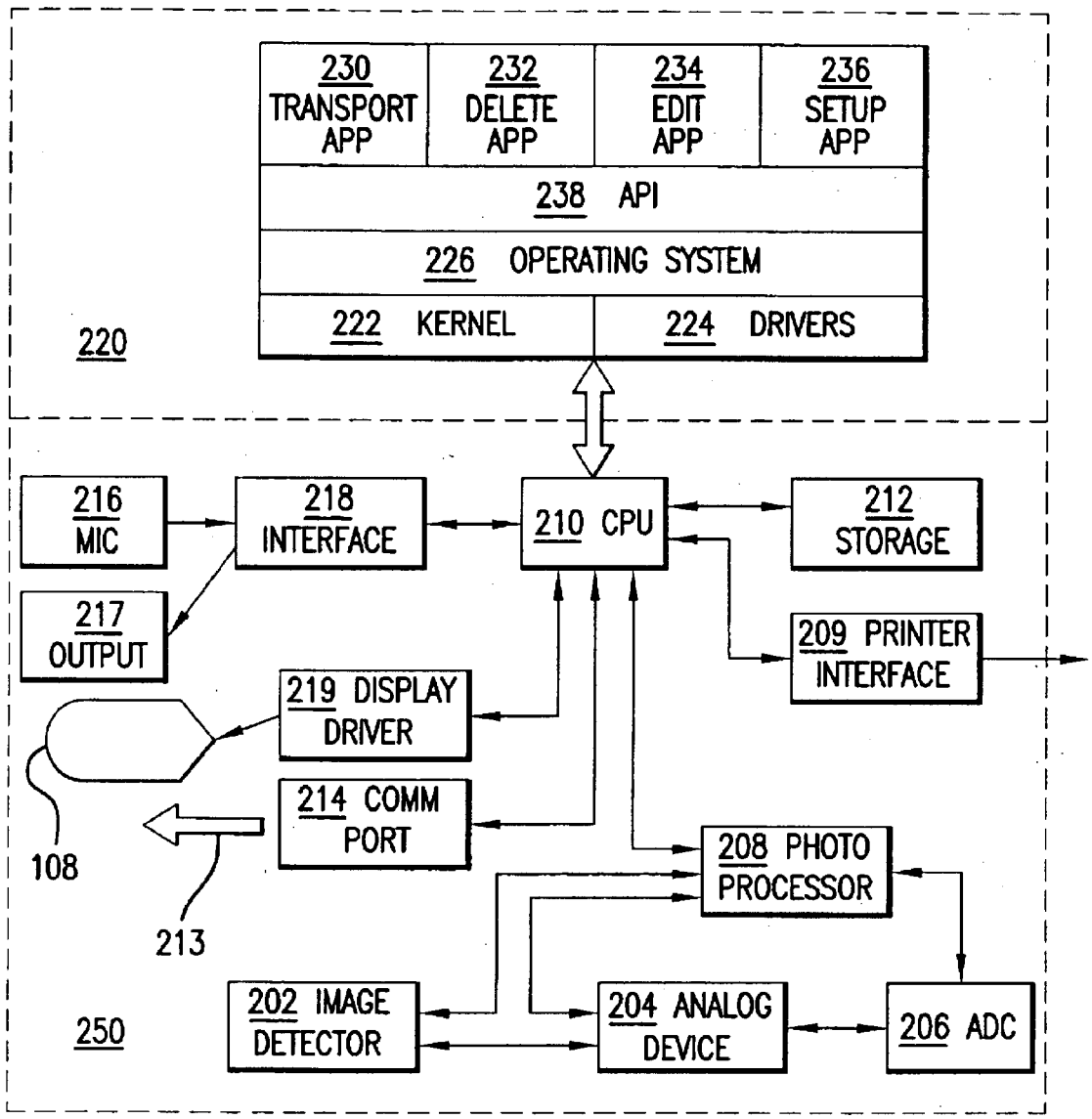
FIG. 2 is a block diagram of selected physical and logical components of a digital camera according to an embodiment.

FIG. 2 is a block diagram of an architecture 200 including selected physical and logical components of the digital camera 100, according to an embodiment. Architecture 200 of the digital camera 100 comprises certain software elements 220 and hardware elements 250. Among the hardware elements 250, an image detector 202 is optically coupled to a main lens of the camera 100. As in a conventional camera, a shutter is interposed between the main lens (not shown) and the image detector 202. When the shutter is opened, the image detector 202 receives light reflected from a subject and focused by the lens, and an image is formed at the image detector. An example of an image detector 202 is a charge-coupled device (CCD) that comprises an array of detectors or elements.

The image detector 202 produces a plurality of analog image signals that are generally proportional to the amount of light falling on the image detector 202, e.g., elements of the CCD. The analog image signals are coupled to an analog device 204, which can be an analog chip or photo color device. The analog device 204 receives the signals from the image detector 202 and organizes them into a discrete set of analog signals having pre-determined values. The analog device is coupled to an analog-digital converter (ADC) 206 that receives the analog signals from the analog device 204, and converts the analog signals into a plurality of digital signals. According to example embodiments, the ADC 206 performs 8-bit or 12-bit analog-to-digital conversion.

The ADC 206 provides its digital outputs to a photo processor 208. In one embodiment, photo processor 208 is implemented as an application-specific integrated circuit (ASIC) device that controls operational parameters of the image detector 202 and the analog device 204. The photo processor 208 may also buffer or groom the digital signals received from the ADC 206 to improve or modify image quality.

The photo processor 208 is coupled to a central processing unit (CPU) 210, which is a microprocessor in one embodiment. The CPU 210 provides central control for others of the hardware elements 250 of the architecture 200 and executes software elements 220, as described below. The CPU 210 is coupled to one or more storage devices 212. For example, the storage devices 212 can include a flash memory card that provides non-volatile storage of digital images or photos taken by the digital camera.

The CPU is also coupled to input/output devices such as a communications port 214. For example, the CPU 210 can be coupled to a telephone line 213 through a communications port 214 in the form of a modem that is comprised of a coder/decoder (codec) and a digital-to-analog adapter (DAA). Using the modem, the CPU 210 can communicate data over a conventional telephone line to a remote device such as a server, personal computer or workstation, or printer. A modem is merely one example of a device suitable for use as communications port 214. Alternatively, the communications port 214 is an infrared communications device, an Ethernet interface, an ISDN terminal adapter, or another telecommunications device. The specific communication method, protocol or mode used by communications port 214 is not critical. In addition, the hardware elements 250 can include more than one such communication device.

In one embodiment, CPU 210 also is coupled to a microphone 216 through an appropriate interface 218. Preferably, the microphone 216 is mounted in or on the body 102 of the camera 100 (see FIG. 1). The interface 218 converts analog voice signals received from the microphone 216 into a digital signal that is representative of the voice signals. The interface 218 enables the CPU 210 to receive, use and manipulate voice commands or voice message information spoken by a user of the digital camera into the microphone 216. The interface 218 preferably is also coupled to an output device 217. The interface 218 can receive digitized audio information convert it to analog form, pre-amplify the resulting analog signal, and drive the output device 217. In combination, the interface 218 and output device 217 enable the CPU 210 to play digitized audio files or voice messages in an audible way. The output device 217 can be a loudspeaker, or an output connector or jack that can be connected to an amplifier and speaker or to a pair of headphones.

The CPU 210 is also coupled to the display device 108 through a display driver 219. The CPU 210 communicates, to the display driver 219, the form and content of information to be displayed on the display device 108. The display driver 219 determines how to display the information and drives the display device 108, for example, by causing the display device 108 to illuminate pixels of an LCD array at appropriate locations. In a particular embodiment, the display device 108 has a touchscreen formed integrally with the display. In this embodiment, the display driver 219 also includes circuitry or firmware for receiving signals from the touchscreen that represent user selection of elements shown in the display. Alternatively, a separate touchscreen driver circuit or chip is used.

In one embodiment, CPU 210 is also coupled to a printer interface 209 that can connect to an external printer (not shown), for example an image-quality printer. Using printer interface 209, under program control, CPU 216 can command such a printer to print a tangible copy of a stored photo. In a particular embodiment, printer interface 209 communicates data to the printer using infrared light signals. Of course, any other type of printer interface can be used alternatively.

In another alternative embodiment, the CPU 210 is coupled to a hot-pluggable external interface located in or on the camera body 102. The hot-pluggable external interface enables the digital camera 100 to be connected to a docking station whereby the digital camera may communicate data and images to external computing devices, such as a personal computer.

The CPU 210 can execute software elements 220. In one embodiment, the software elements 220 of the architecture 200 are arranged in multiple logical levels. At the lowest logical level, the CPU 210 executes a kernel 222 and one or more drivers 224, which cooperate to control and supervise the hardware elements 250. For example, the drivers 224 can include a driver program that controls and supervises operation of the image detector 202, the analog device 204, and the photo processor 208.

The CPU 210 executes an operating system 226. The operating system 226 is arranged at a logic level higher than the kernel 222 and drivers 224, so that the operating system 226 can use services embodied in the kernel and drivers. In one embodiment, the operating system 226 is the Microsoft Windows CE operating system.

An application programming interface (API) 228 is logically interposed between the operating system 226 and one or more application programs 230–236. The API 228 provides an application programming interface (API) so that the application programs 230–236 may use services of the operating system 226, kernel 222 and drivers 224 by calling functions organized according to high-level abstractions. In such a configuration, the application programs 230–236 are insulated from implementation details or intricacies of the operating system 226, kernel 222 and drivers 224. In one embodiment, the API 228 provides functions accessible through function calls that express abstract program behavior and simplify application program development. For example, the API 228 provides functions for retrieving images, storing images, manipulating image elements, receiving or outputting information, and other functions.

In one embodiment, the CPU 210 can execute a transport application 230, an edit application 232, a print application 234, and a camera control application 236. Generally, the transport application 230 can provide image transport functions, enabling a user of the digital camera 100 to send one or more stored pictures or images from the camera to one or more external addresses. The edit application 232 can provide image editing functions, enabling a user of the digital camera 100 to edit, retouch, or alter one or more stored pictures or images while they are stored in the camera. The print application 234 can provide image printing functions, enabling a user of the digital camera 100 to print one or more stored images directly from the camera to a printer. The camera control application 236 can provide camera control functions, enabling a user of the digital camera 100 to adjust settings of the camera such as the exposure time, flash on/off, zoom, whether manual focus or autofocus is enabled, red eye removal, flash fill, exposure intensity, etc. In alternate embodiments, other application programs, or a subset of the above applications can be executed.

In alternative embodiments, the software elements 220 are implemented in the form of firmware or hardwired circuitry that carries out the functions described herein. Thus, implementation in software in this arrangement is not required.

IMAGE TRANSPORT APPLICATION AND SERVICE

The transport application 230 is now described with reference to FIGS. 3A–C, FIGS. 4A–G, and FIG. 5.

Figure 3A:
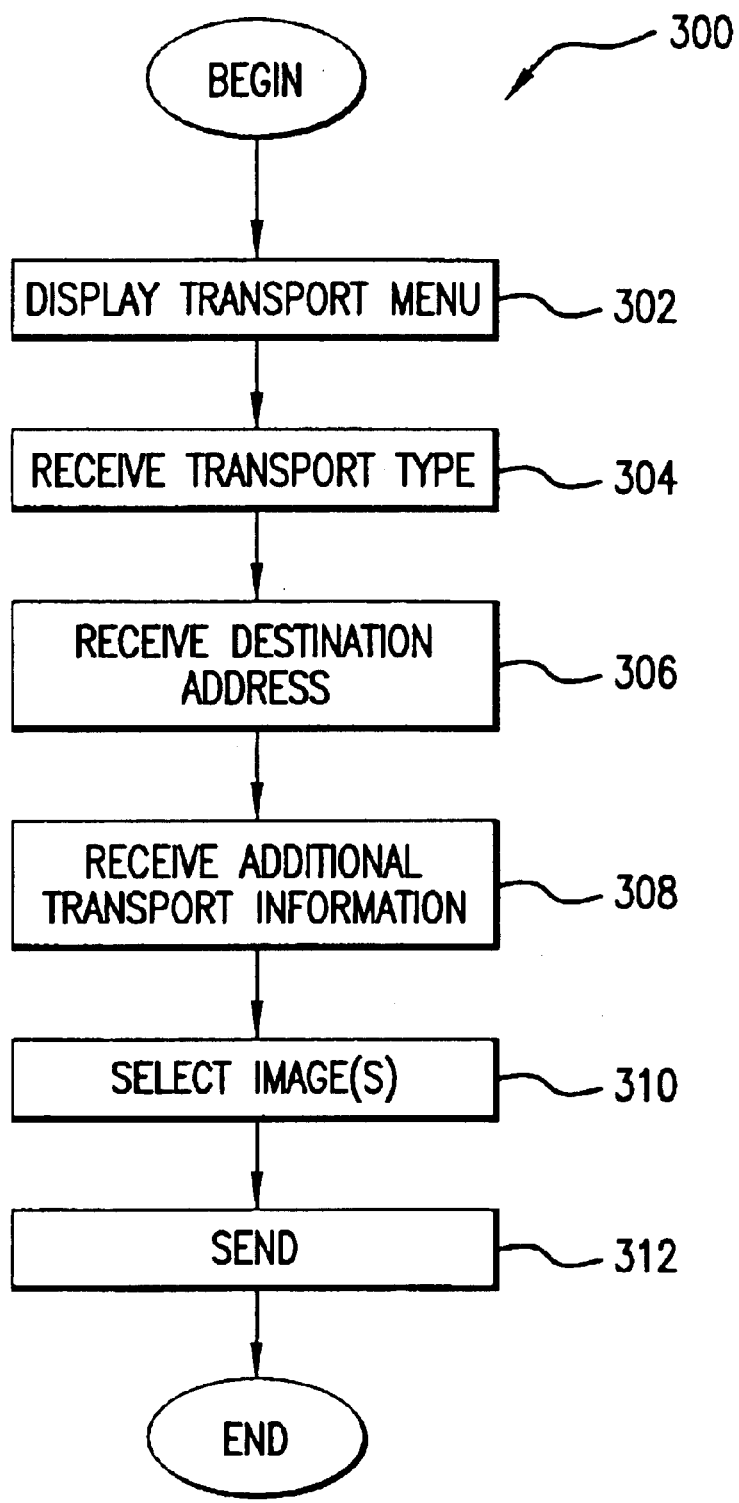
FIG. 3A is a flow diagram of a method of transporting an image, according to an embodiment.

FIG. 3A is a flow diagram of an embodiment of a transport method 300 using the image transport application 230. Operation of the image transport application 230 includes displaying a transport menu, as shown by block 302. An example of such is illustrated by the transport menu screen 404, shown in FIG. 4A, which includes one or more transport type buttons 406a–d. In block 304, a transport type selection is received, for example when a user selects one of the transport type buttons 406a–d included in the transport menu screen 404 of FIG. 4A. The transport type can be selected by manipulation of one or more of the selection buttons 110, 112, or 114 of the digital camera 100 or by use of a finger or stylus touching the display device 108 (see FIG. 1). The use of scroll bars, selection buttons, and styluses are well known to those skilled in the art, and a stylus can be any instrument for touching a desired portion of the display device 108.

Figure 3B:
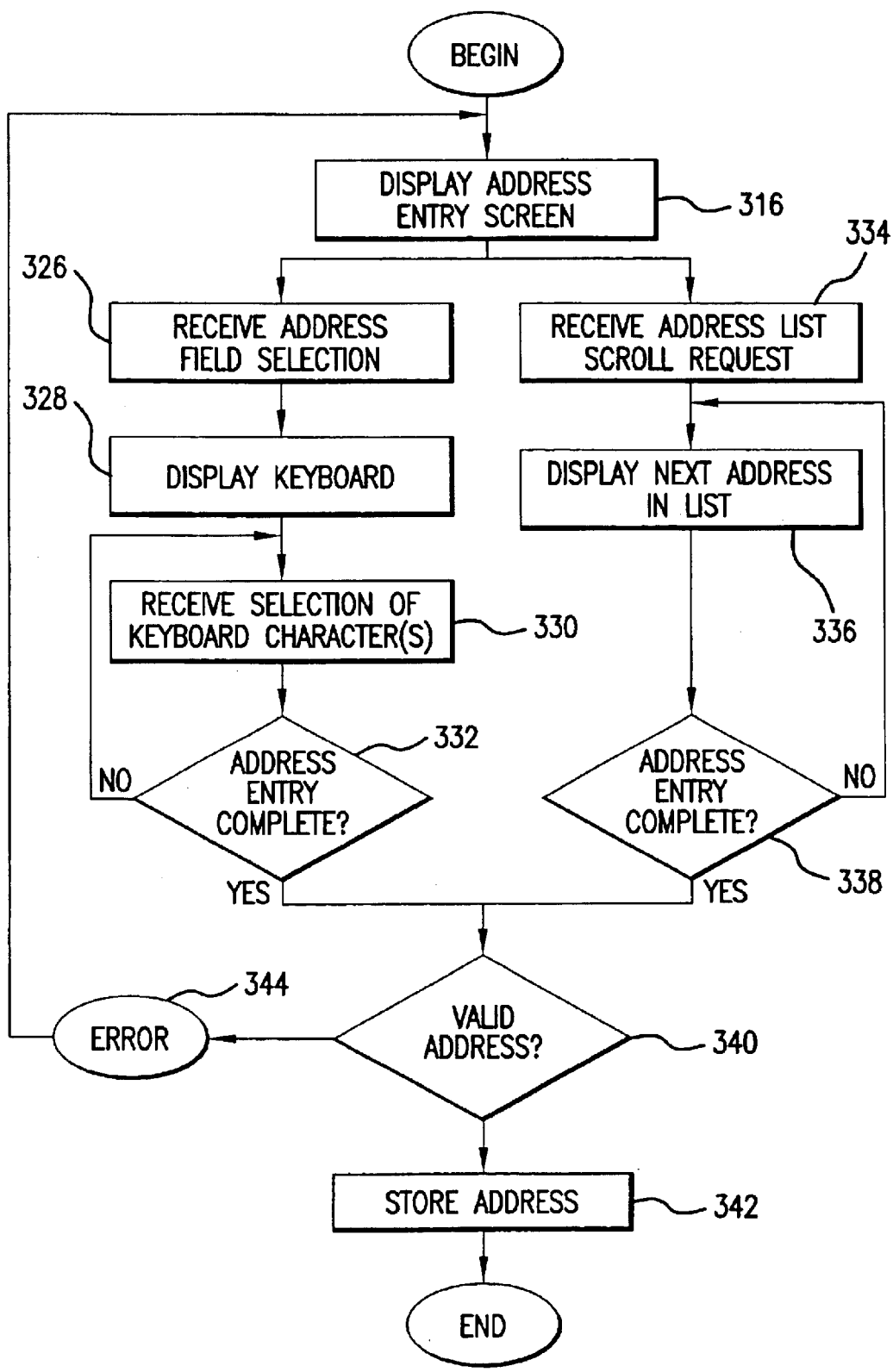
FIG. 3B is a flow diagram of an operation of the method of FIG. 3A, according to an embodiment.

A destination address is received in block 306, a more specific example of which is further illustrated in FIG. 3B. The transport method 300 can also include receiving other transport information in block 308. For example, such information can include a message, aural and/or typed, to accompany the transported image(s), and/or the quantity of each printed and/or developed image. Also, characteristics of the printed and/or developed image can be received, such as the desired size, orientation, paper type, or other photo-processing characteristics. In block 310, one or more images can be selected for transport. This can include acquiring one or more images, selecting one or more images acquired before the image transport process, or both, as described further below with reference to FIG. 3C. The image(s) is sent to a desired destination in block 312, a more detailed example of which is shown in FIG. 3D.

Image Addressing

FIG. 3B is a specific example of steps including in receiving a transport destination address in block 306 of FIG. 3A. When a user selects the transport type button 406a (see FIG. 4A), as in block 304 of FIG. 3A, the transport application 230 displays an address entry screen in response, as indicated by block 316 of FIG. 3B. In a particular embodiment, the address entry screen 412 of FIG. 4B is shown on the display device 108. As shown in FIG. 4B, address entry screen 412 generally comprises an address entry field 414 and virtual option buttons 415a–c. Option buttons 415 can include a Cancel button 415a, a Back button 415b, and a Next button 415c, discussed further below.

The address entry field 414 can include a scroll bar 414a. The address can be entered by the user operating the scroll bar 414a to display one or more addresses, and to select one or more of these addresses. When so performed, the transport application successively receives a request for scrolling the address list in block 334, and in block 336 displays the next address of a stored list until the user stops operating the scroll bar and address entry is completed in block 338. The scroll bar 414a can be operated by manipulation of one or more of the selection buttons 110, 112, or 114 of the digital camera 100 or by use of a finger or stylus touching the display device 108 (see FIG. 1).

Alternatively, the transport application can receive selection of the address entry field 414 in block 326 by, for example, user operation of the selection buttons 110, 112, 114, a finger, or a stylus. In response, a virtual keyboard 416, as shown in FIG. 4C is displayed on the display device 108, in block 328. The virtual keyboard 416 can be a graphical representation of an alphanumeric keyboard or any other combination of letters, numbers, and symbols. The transport application can then receive selection of keyboard characters in block 330 by the user selecting, touching, or pressing one or more keys of the virtual keyboard with one or more of the selection buttons 110–114, a finger or a stylus. The selected keyboard characters can thereby form an address 418, and address entry can be completed when selection of a completion button, such as the Enter button 420 on the virtual keyboard 416, is received in block 332. In addition or alternatively, address entry can be completed by selecting the Next button 415c or the Cancel button 415a. The address 418 may be an electronic address, such as an electronic mail address that follows the Internet addressing format. Alternatively, the address 418 may be a physical address, such as a postal mail address. Any appropriate address format may be provided.

In another embodiment, the transport application 230 has an auto-completion function. Each time that a user enters an address, the transport application 230 stores the address in an ordered internal table in the storage device 212. As the user subsequently enters an address, the auto-completion function examines the keystrokes or characters. With each keystroke or character, the auto-completion function compares the partial address entered at that point, to the addresses in the internal table. If a match occurs, the auto-completion function retrieves the complete address from the internal table and displays it in the address entry field 414.

In some embodiments, a user may also enter text describing a subject of the photos or message. In these embodiments, address entry screen 412 can further include a subject data entry field 422 in addition to the address entry field 414, as illustrated in FIG. 4D. A user may select the subject data entry field 422 using the selection buttons or by touching or pressing on it with a finger or stylus. In response, transport application 230 displays a cursor in the subject data entry field 422 and displays the virtual keyboard 416 in the address entry screen 412. The user may enter text for the subject line using the virtual keyboard 416 as described above with reference to FIG. 4C. The transport application 230 displays each character in the subject data entry field 422 as it is entered by the user. When the user selects an Enter key 420 on the virtual keyboard 416, the transport application stores the characters that were entered, for example, in a subject string variable associated with the address received in block 306. In addition, the address entry screen 412 is displayed as illustrated in FIG. 4D, including the address entry field 414 and the subject data entry field 422 with the entered characters 423.

After address entry is determined to be complete in block 332 and/or when the Cancel button 415a is selected, the transport application can also check whether the received address is valid, as shown in block 340 of FIG. 3B. Block 340 may involve various validity checks and tests. For example, block 340 may involve testing whether the address 418 conforms to Internet addressing protocols or whether the address is formatted as a recognizable postal mail address. If the address is found to be invalid, then an error condition occurs in block 344. In one embodiment, at block 344 the transport application generates a prompt to the user that asks whether the user wishes to correct the address or discard it. This enables the user to "fix" an incomplete or erroneous address before the process continues. In the absence of or after the rejection of such an opportunity, the application discards the current address 418 and the process can end or return to block 302, 304, 316, or to any other appropriate process of the application.

If the address is found to be valid in block 340, then in block 342 the address 418 is stored in the storage device 212, for example, in a list of current addresses. Control can then be passed to block 308 and the application continues. In addition or alternatively, control can be passed to block 316 in which the user may enter another address. Thus, using a loop formed by blocks 316 through 346, the user may enter and store one or more addresses to which one or more stored images or photos can be sent. The Next button 415c or some other appropriate button can be selected to indicate that no additional addresses will be entered, and the process continues in block 308.

In one embodiment, it is desirable to minimize address validity checking in the transport application. This is because additional validity checking can be carried out in other stages and by other equipment, and because it is desirable to permit the user to enter virtually any type of address, and then use more powerful equipment and processing at another location to interpret or parse the address.

Non-Traditional Image Addressing

According to another embodiment, the addressing of messages in block 306 of FIG. 3A supports non-traditional addresses. As used herein, a "non-traditional" address is an address that is difficult to enter using virtual keyboard 416. For example, a non-traditional address may be in a language not supported by virtual keyboard 416 or otherwise require a different character. According to this embodiment, when a user selects transport type button 496a in block 304, then as illustrated in FIG. 4H, the user is presented with an addressing screen 424 and choice of selecting traditional addressing, non-traditional addressing or returning to the prior screen by selecting one of buttons 424a, 424b or 424c, respectively.

Selecting traditional addressing via button 424a causes the steps to be performed to enter a traditional address as previously described herein. Selecting non-traditional addressing button 424b provides for the use of a non-traditional address. According to one embodiment, selecting non-traditional addressing button 424b causes image address display 425 (FIG. 4I) to be displayed, which allows a user to capture and store one or more address images to which one or more images are sent.

Address images are provided to a fulfillment house along with one or more stored images. Address images may take many forms and the invention is not limited to a particular address format. For example, the address image may be of a hand written address, a page from an address book, a business card, a rolodex card, or any other form that can be captured in an image. Address images may include any type of address information. Examples of address information include, without limitation, names, addresses, facsimile numbers, telephone (cellular or land line) numbers and email addresses. Non-traditional image addressing allows images to be sent to addresses in any form and any language, regardless of the character set supported by virtual keyboard 416.

Multiple address images may be collected, stored and recalled on demand. Each address image may be displayed in display 426 by selecting any of image selectors 427a–d or by scrolling through stored address images using selectors 428a and 428b. Address images may be deleted using trash selector 429a. A currently displayed address image may be enlarged by selecting a zoom selector 429b. An address image indicator 429c indicates the current number of address images taken. One or more address images are selected by a user selecting a done selector 429d. Thus, a user may capture and store a digital image and then store and capture one or more address images for the digital image. Alternatively, a user may capture and store a digital image and recall one or more previously stored address images.

Address images do not have to be captured and stored by the same digital camera that forms a digital image. According to one embodiment, address images are received by a digital camera over a communications medium, for example, a network, any type of interface connection, or over a wireless connection.

Option Buttons

When the Next button 415c (see FIGS. 4B–D) is selected by a user, the transport application 230 of FIG. 2 can generate a display showing the next logical step in the message transport process. For example, when the user is addressing a message and activates the Next button, the transport application can continue to the "choose photo" function described below in connection with FIG. 4E, or to another next logical step of the application. Activating the Back button 415b produces the opposite effect; the transport application generates a display showing the previous logical step. In this way, the user is substantially never "lost" in the message transport process. Next and Back buttons may be provided and used in this manner, alone or with a Cancel button 415a.

Figure 4A:
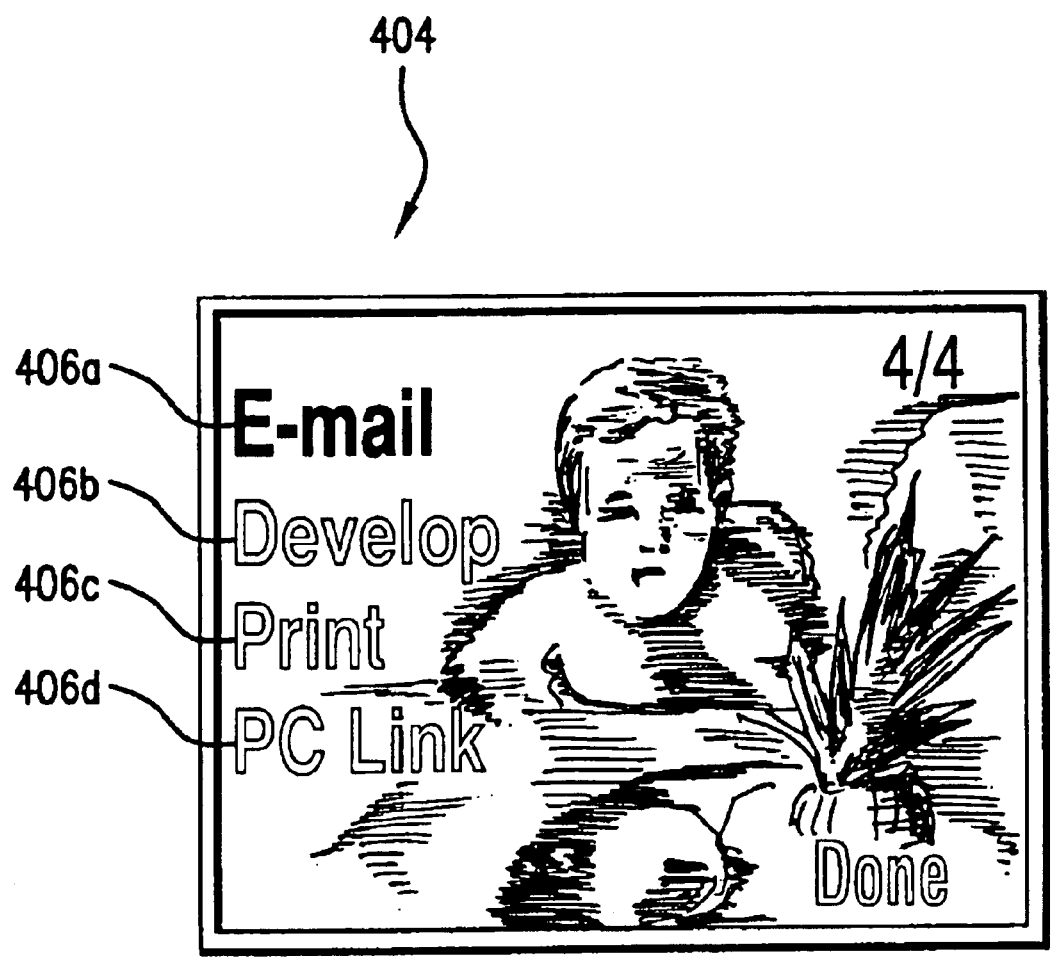
FIG. 4A is a diagram of a display generated during an image transport step of the method of FIG. 3A, according to an embodiment.
Figure 4B:
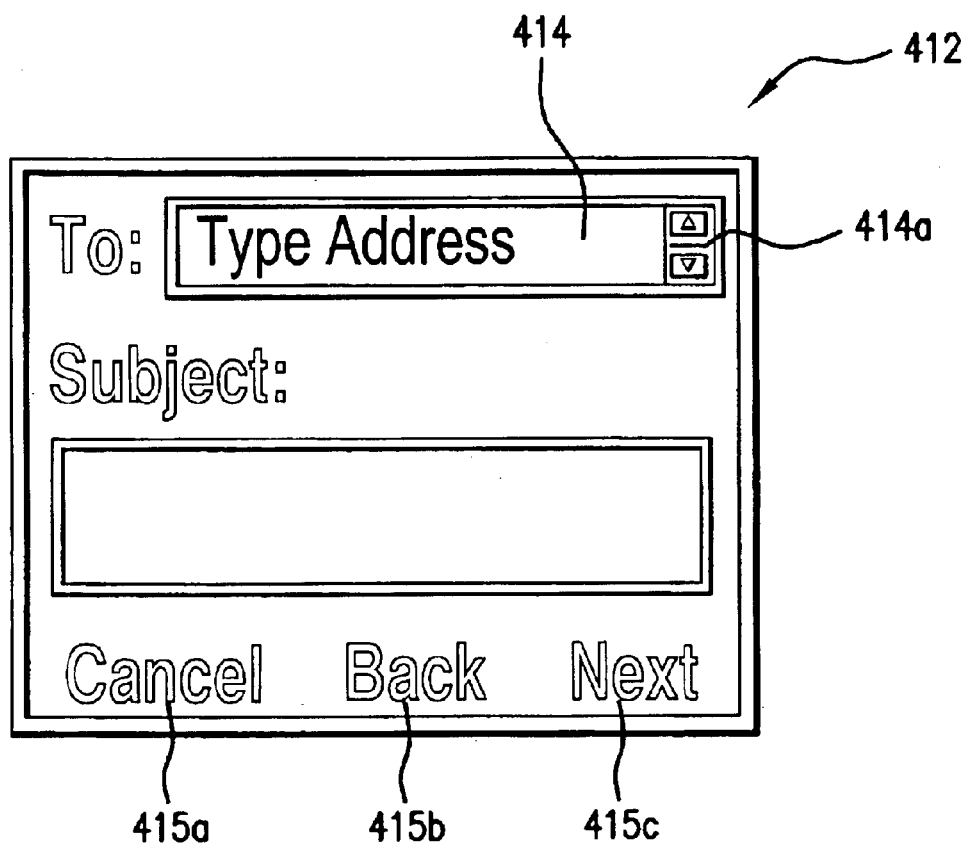
FIG. 4B is a diagram of a display generated during an addressing step of the image transport application.
Figure 4C:
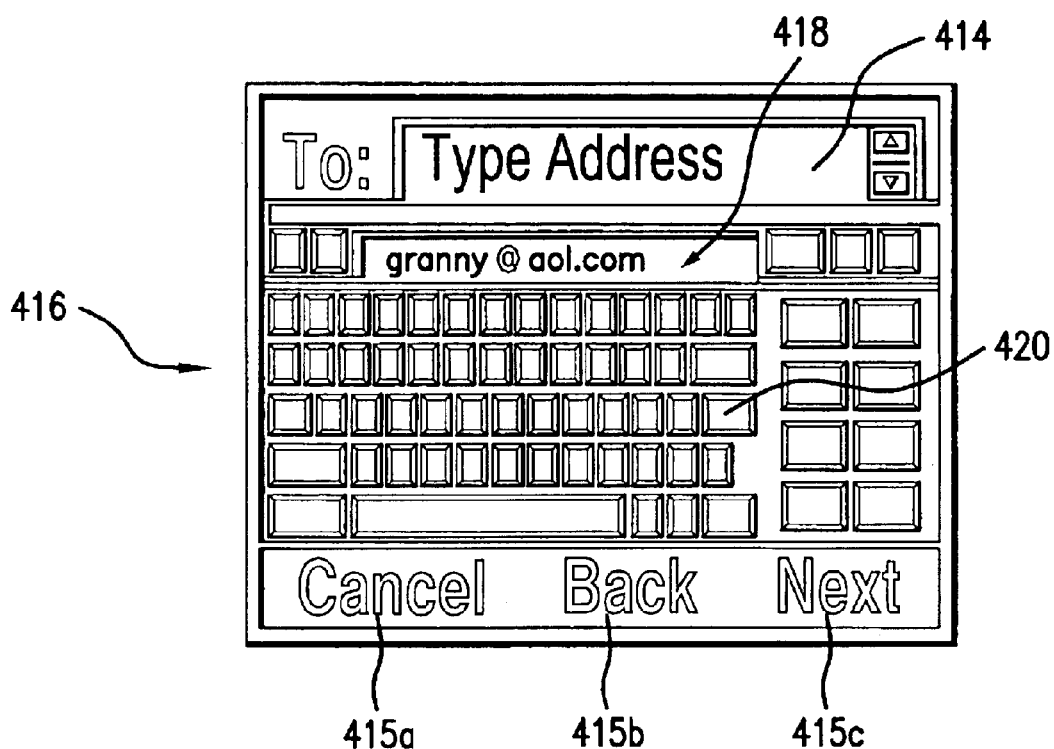
FIG. 4C is a diagram of a display generated during a keyboard entry step of the image transport application.
Figure 4D:
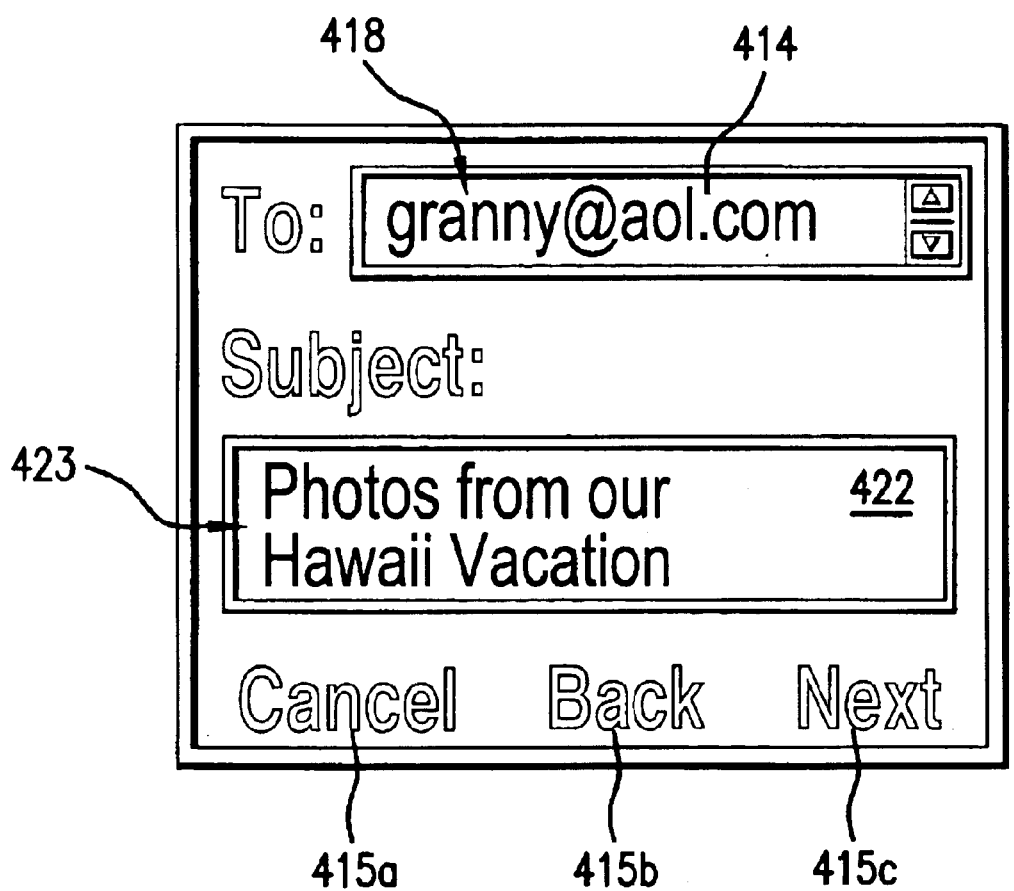
FIG. 4D is a diagram of a display generated during a subject entry step of the image transport application.

The Cancel button 415a can be used to terminate an address entry session and return to the transport menu such as in FIG. 4A. In a particular embodiment, a user may activate the Cancel button 415a at any time that it is displayed. As an example, when the Cancel button 415a is selected during address entry of block 306, the transport application tests whether the current address 418 is valid. If so, it is stored in the current address list, and control returns to block 302 and the transport menu screen 404 is displayed. Alternatively, control can return to any other point in the application, with the appropriate corresponding display on display device 108. While Cancel button 415a is shown with the Next and Back buttons in FIG. 4A, any combination thereof can be included. For example, the Next and Back buttons can alternatively be included alone.

Image Selection

Figure 3C:
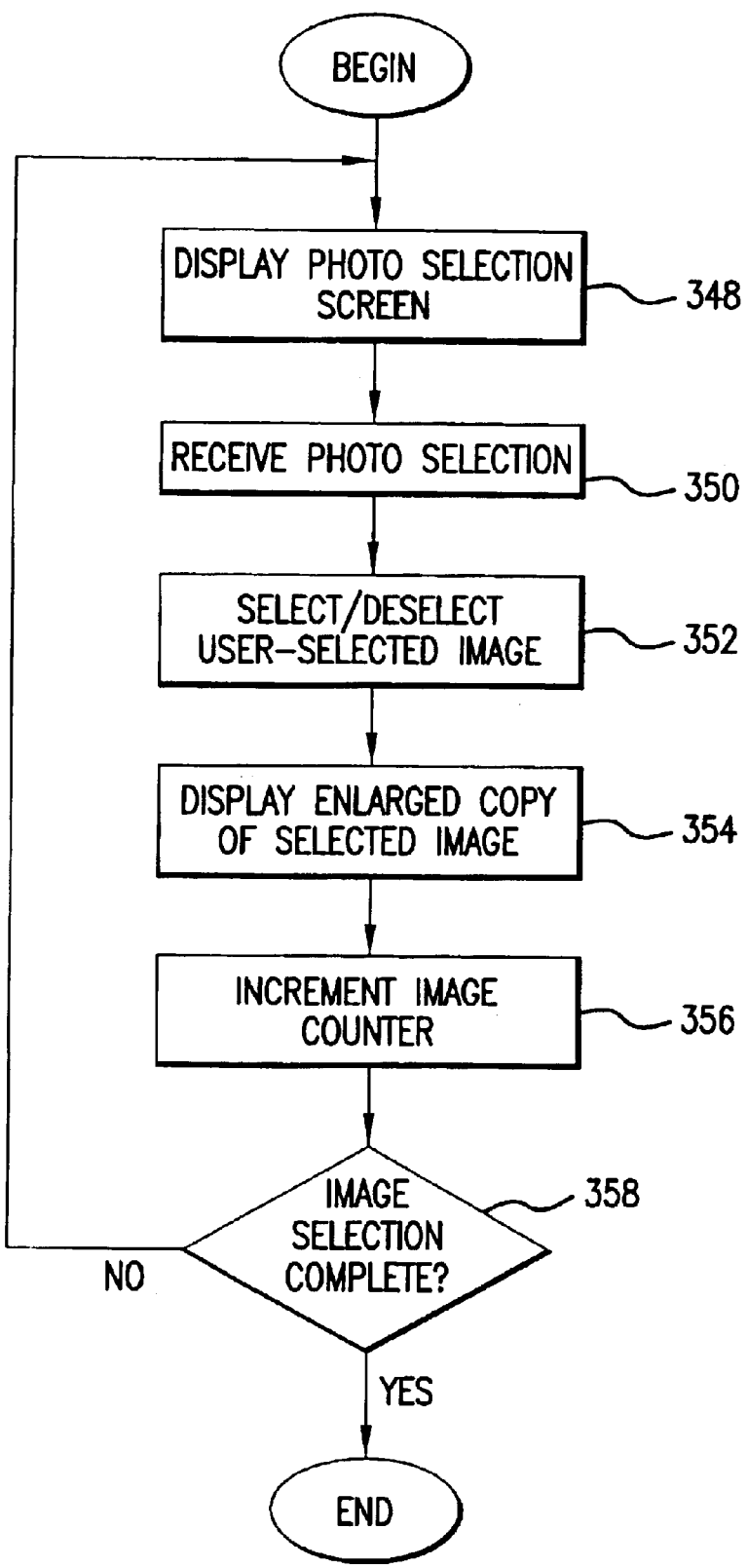
FIG. 3C is a flow diagram of an operation of the method of FIG. 3A, according to an embodiment.
Figure 4E:
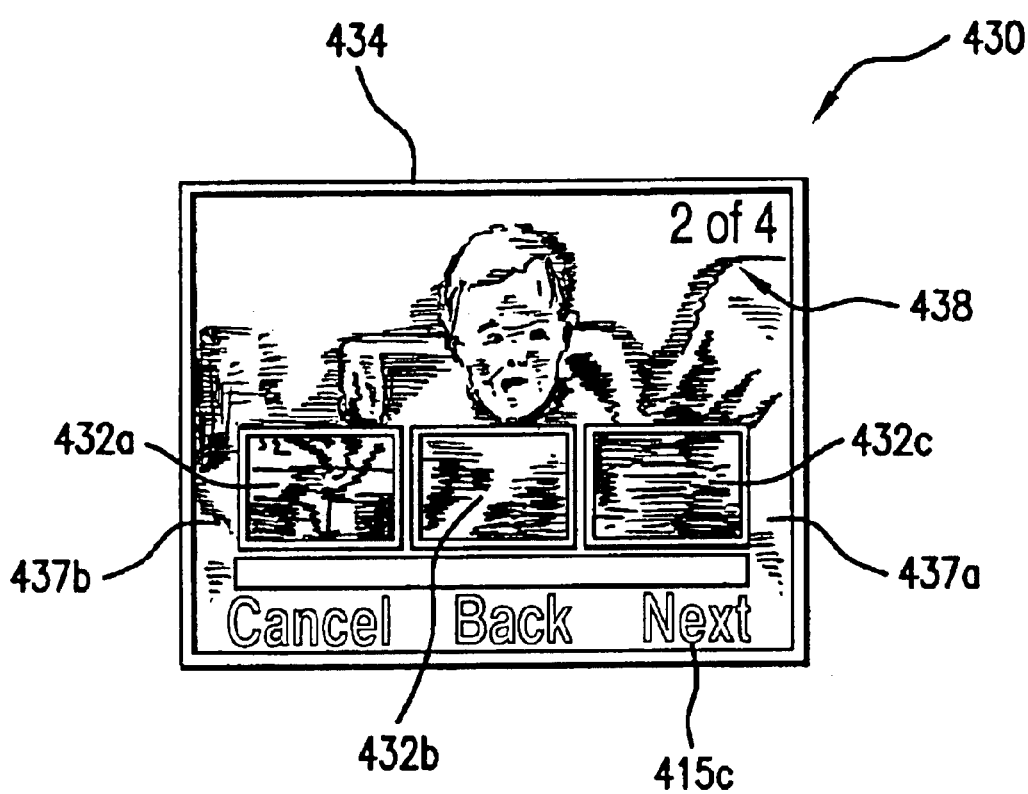
FIG. 4E is a diagram of a display generated during an image selection step of the image transport application.

Generally, after entering one or more addresses, in block 310 a user can next select one or more stored images, such as digital photos, to be sent to the one or more received addresses. As shown in FIG. 3C, in block 348 the transport application displays a photo select screen. FIG. 4E is an example of a photo select screen 430 that is generated during the image selection step of the image transport application. The photo select screen 430 comprises a plurality of images 432a–432c, each of which is a small-size representation of a previously taken digital photo that is stored in a storage device in or in communication with the digital camera 100. Thus, the images 432a–432c comprise "thumbnail" views of stored photos. Although three (3) images 432a–432c are shown in FIG. 4E, this number is not critical, and any appropriate number of images can be shown in thumbnail form.

Normally, a digital camera can store a large number of digital images. For example, a digital camera can have a miniature storage device, such as a hard disk drive, mounted in it for image storage. Such disk drives are capable of storing on the order of several hundred images. Since only a few "thumbnail" views of the images can be displayed at a given time, the photo select screen 430 has backward/forward scroll buttons 437a, 437b. When a user selects buttons 437a, 437b, the images 432a–432c conceptually scroll left or right, respectively. This causes one or more of the images 432a–432c that is at the end of the display to disappear from the displayed screen, and one or more other images from among the stored digital images to be displayed.

The photo select screen 430 also has an enlarged image 434 that reproduces one of the current or stored images, such as one of the displayed thumbnails 432a–432d, in enlarged form. For example, the enlarged image 434 can show a currently selected or highlighted image. The enlarged image 434 enables a user of the digital camera to see a more clear view of a particular image.

A counter field 438 displays the current number of images that have been selected (as described below) from among images 432a–432c and others stored. A ZOOM button or icon (not shown) can enable a user to zoom in on a portion of an image that is displayed as the enlarged image 434.

In block 350, the transport application receives a photo selection from the user. In one embodiment, a user taps a finger or stylus on one of the thumbnail images 432a–432c. In response, the transport application selects or deselects the image, as shown in block 352. If the selected image 432a–432c has not been previously selected, then the image is selected. In that case, block 352 preferably involves displaying a colored or highlighted border around the selected image or otherwise distinguishing the selected image from those that have not been selected. As shown in block 354, an enlarged copy of the selected image is displayed as the enlarged image 434. The value displayed in the counter field 438 is incremented and redisplayed in block 356. An identifier of the selected image is stored in the storage device for later use. Thus, the transport application maintains a stored list of selected images.

Alternatively, if the image chosen by the user has previously been and still remains selected, then in block 352 the image is de-selected. The colored border or other distinguishing aspect is turned off, and the value displayed in the counter field 438 is decremented and re-displayed.

The application determines whether image selection is complete in block 358. For example, such completion can be indicated when the Next button 415c is selected. When such completion is determined, control can pass to block 312 to send the images, or to any other appropriate point in the application. Also, the stored list of selected images is maintained in the storage device. For example, the selected images are associated with the address(es) entered by the user as described herein and stored in a data structure, conceptually serving as an "out-box" or output queue that is maintained in the storage device.

Accompanying Message

Figure 4F:
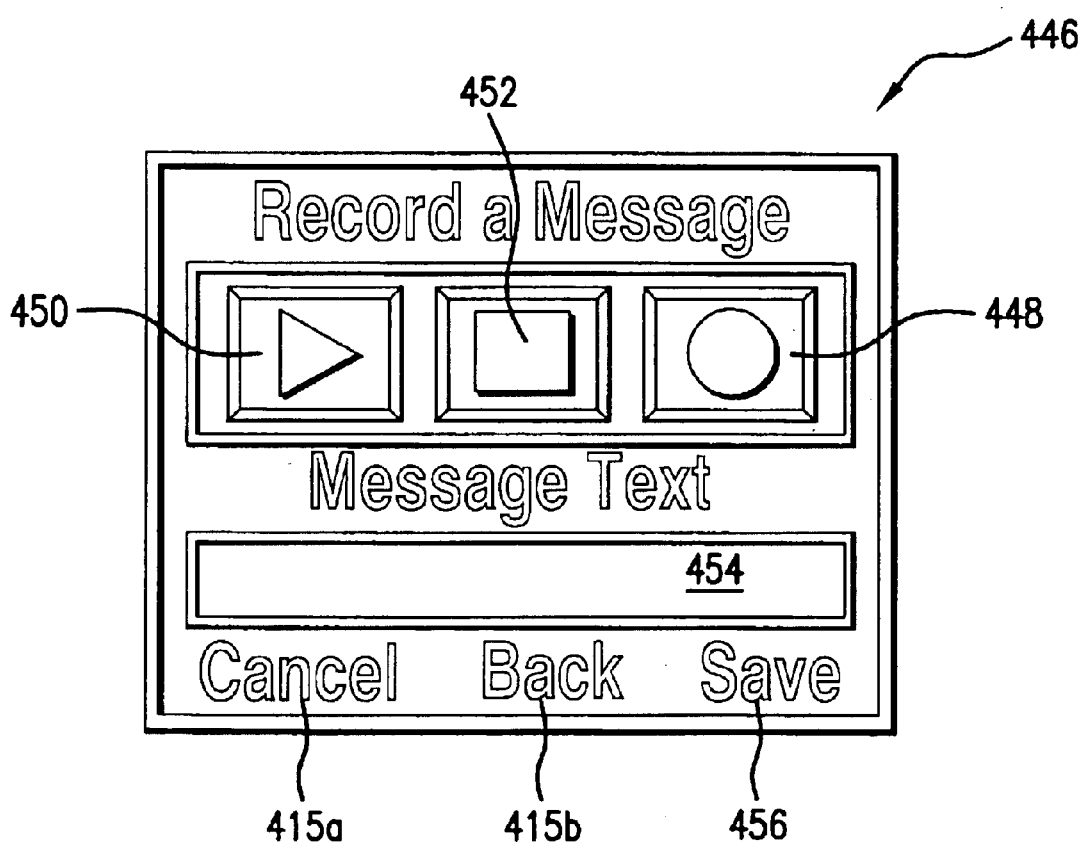
FIG. 4F is a diagram of a display generated during a messaging step of the image transport application.

Optionally, a user may record a voice or text message, or both, and associate such message(s) with the selected photos and addresses. To record and associate a message, the user selects an appropriate provided button (not shown). FIG. 4F is an example of a display 446 generated during a message step of the image transport application. The display 446 includes a Record button 448, a Play button 450, and a Done button 452 to facilitate voice message recording. The display 446 also includes a message text input field 454, as well as a Cancel button 415a, a Back button, 415b, and a Save button 456.

To record a voice message, the user can tap or touch the Record button 448 with a finger, stylus, or by any other appropriate method of selection. In response, the transport application 230 begins receiving digitized voice information from the microphone 216 through the interface 218 (see FIG. 2). In one embodiment, the transport application 230 calls one or more functions of the operating system 226 or kernel 222 to obtain digitized voice information from the interface 218. The user speaks into the microphone 216 and speaks any desired message. For example, the voice message recorded by the user may be a commentary on one or more images, such as "Hi, Grandma, here are the photos of the grandchildren," or any other desired voice annotation for one or more images. In some embodiments, the received aural voice message can be translated into text, using an appropriate speech recognition application associated with the digital camera 100. To play back a recorded voice message, the user taps, touches, or otherwise selects the Play button 450. In response, the transport application retrieves the previously recorded voice message and plays it back through interface 218 and output device 217.

In the context of a digital camera, it is considered sufficient to record only one voice message per photo and store it in a single area of the storage device. Therefore, the application can be configured such that when the Record button 448 is pressed multiple times, successive recordings overwrite previous recordings.

In addition or in the alternative, a textual message can be received. For example, the user can select the text input field 454. Characters to form a text message can be received and displayed in the text input field 454. These characters can be entered with the aid of a keyboard as described above with reference to FIG. 4C, or by any other suitable method.

When the Save button 456 is selected, the provided message(s), as digitized voice information and/or a text message, is stored in the storage device 212 in association with the list of selected photos and the addresses entered by the user. For example, the message(s) is stored in a file in the storage device 212, using the file system provided by the operating system 226, and the name of the file is stored in an object that associates the name, the names of the selected photos, and the addresses.

Image Send

Figure 4G:
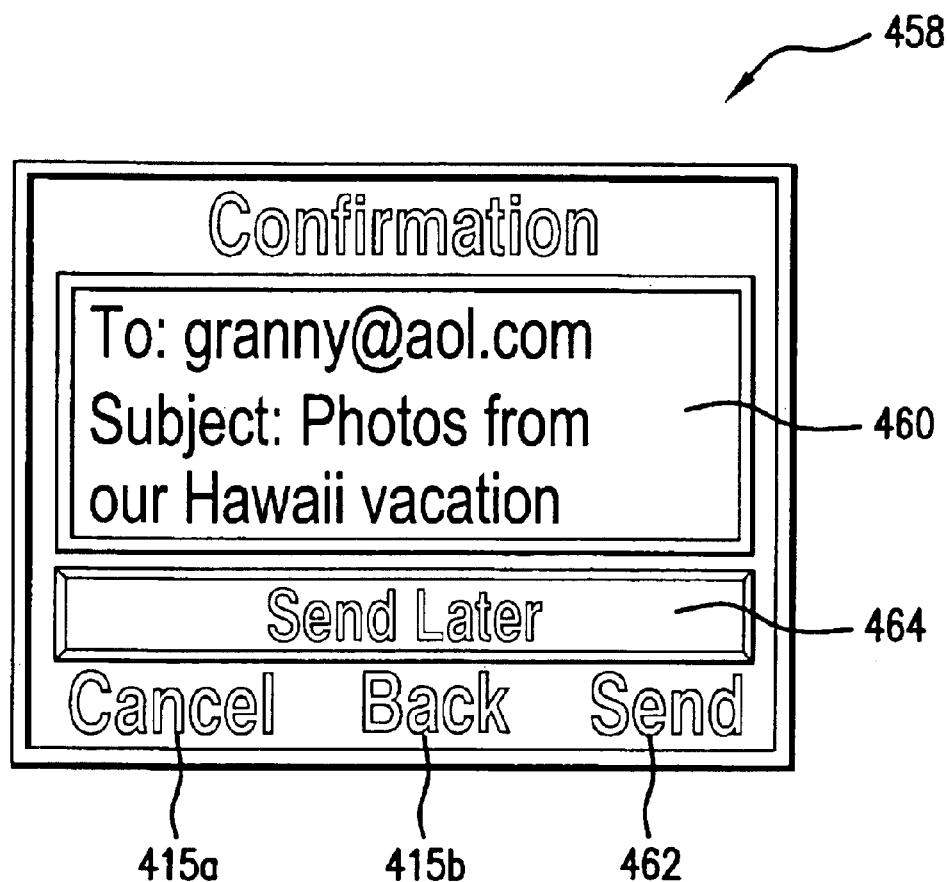
FIG. 4G is a diagram of a display generated during a confirmation step of the image transport application.
Figure 4H:
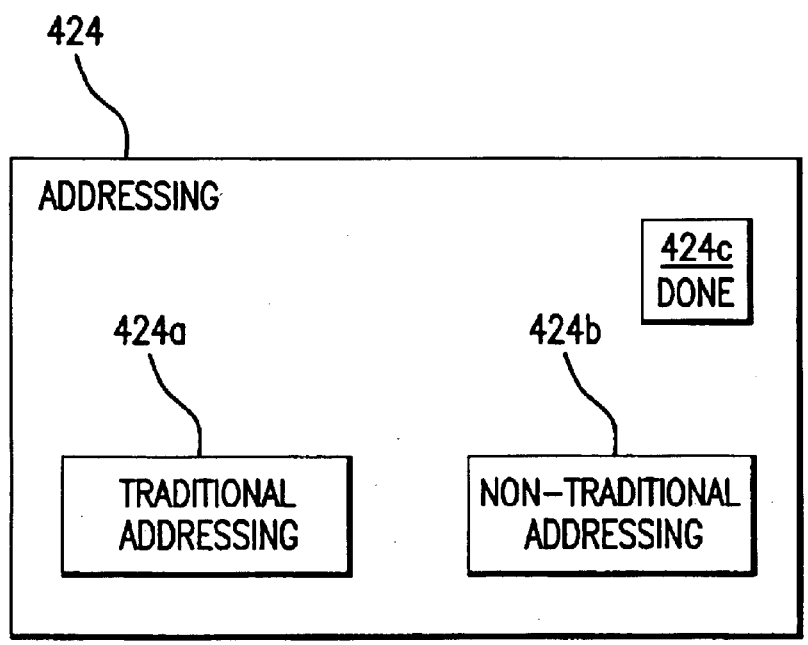
FIG. 4H is a diagram of a display generated during an addressing step of the image transport application.
Figure 4I:
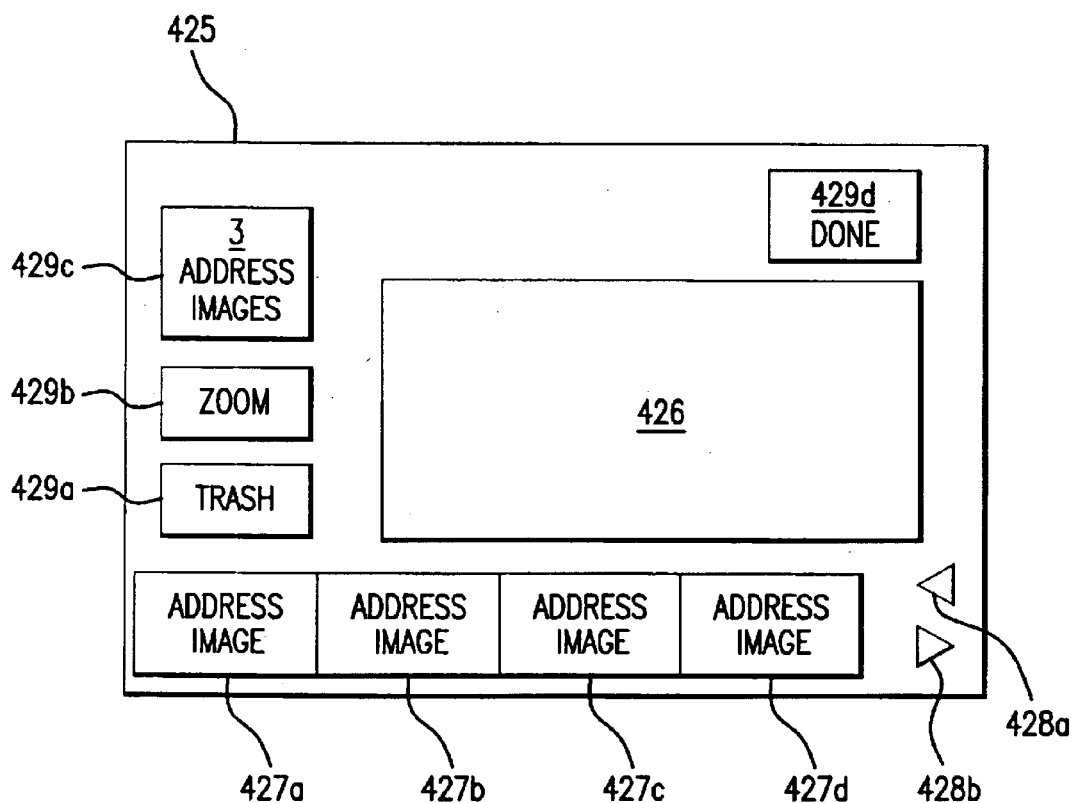
FIG. 4I is a display generated during an addressing step of the image transport application.

After selecting one or more images, providing one or more intended recipient addresses, and optionally recording a message, an image transport confirmation screen 458 is displayed, as illustrated in FIG. 4G. The confirmation screen 458 includes a confirmation box 460, a Cancel button 415a, a Back button 415b, a Send button 462, and a Send Later button 464.

The confirmation box 460 displays an address and any associated subject previously entered. The confirmation box 460 can also display the number of photos to be sent to each address. When the user has entered more than one address, the transport application will send the selected photos to each address in the list separately. In that case, each address may be displayed in the confirmation box 460 separately.

An advisory box also can be included in confirmation screen 458 and display an applicable advisory message directed to the user. For example, an advisory message can be displayed informing the user to connect the camera 100 to the telephone line 213. In response, the user is expected to connect a cable from the camera to a telecommunication device or network. For example, when communication port 214 is a modem, the user connects it to a telephone jack that is coupled to the public switched telephone network. In addition, the confirmation screen 458 can include a message box that includes an indication of an associated stored message(s) and/or, in the case of textual messages, the message(s) itself.

The user may select the Send button 462, Cancel button 415a, or the Back button 415b. A user may dispatch the selected images to the entered addresses by selecting the Send button 462 of the confirmation screen 458. In response, the transport application can display a Sending Message screen (not shown) which can display the current status (e.g., percentage complete or remaining) of the image transport operation. Further aspects of this Send process are discussed below with reference to FIG. 6. When the Cancel button 415a is selected, the send operation terminates and control is passed back to any appropriate point in the image transport application. When the camera 100 and image transport application are engaged in actually sending one or more photos to one or more destinations, selecting the Cancel button 415a will interrupt such a sending operation.

Figure 5:
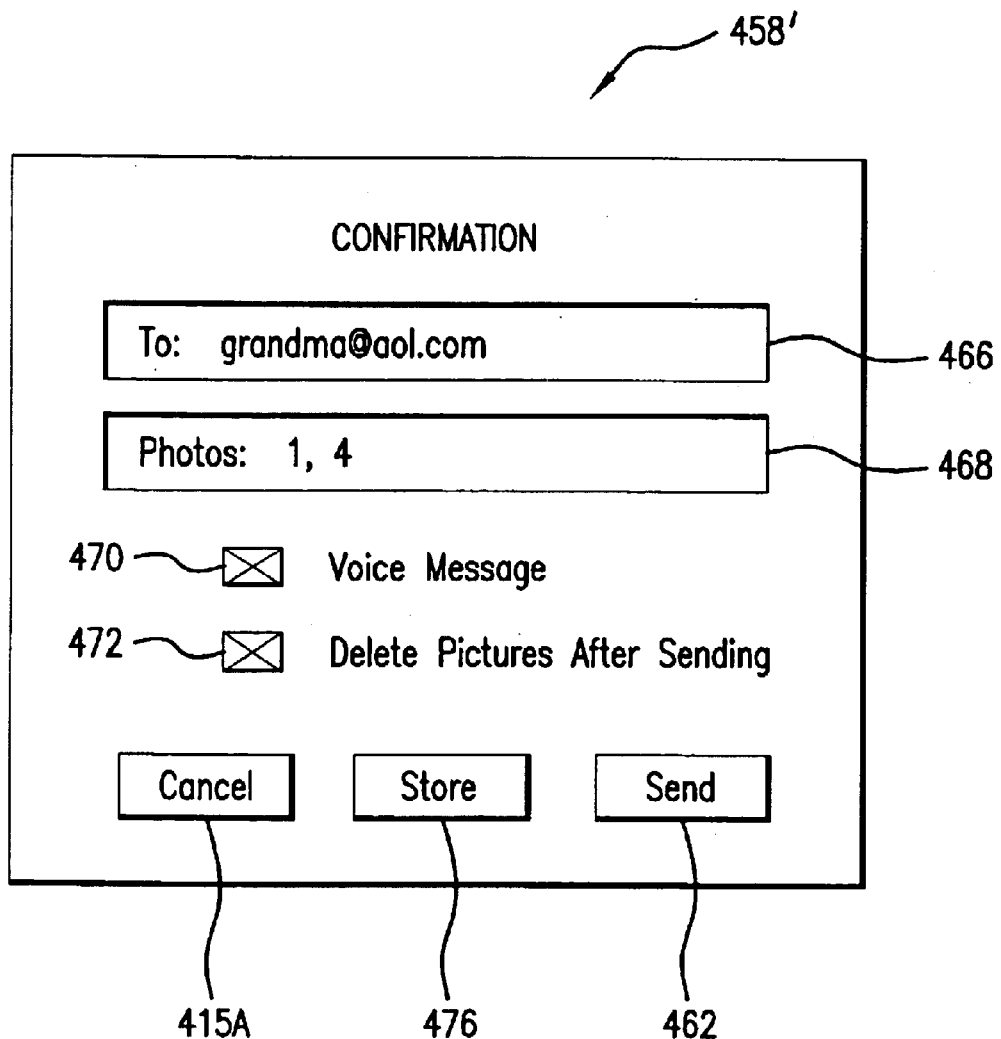
FIG. 5 is a diagram of an alternate display generated during a confirmation step of the image transport application.

In an alternate embodiment, the confirmation screen has the configuration shown in FIG. 5. The confirmation screen 458' comprises an address field 466, a photo field 468, a voice message check box 470, a delete option check box 472, a Cancel button 415a, a Store button 476, and a Send button 462. In this configuration, the address field 466 displays one or more addresses that have been entered by the user. The photo field 468 displays one or more numeric values that identify the photos that will be sent. Each numeric value identifies the ordinal position of a photo in a sequence of photos that are stored in the camera. For example, FIG. 5 shows values of "1, 4", which identify the first and fourth stored photos in association with the camera 100.

The voice message check box 470 indicates whether the user wishes to transmit a pre-recorded voice or text message with the photos. When the check box 470 is checked, the transport application 230 will transmit a message previously recorded by the user along with the photos identified in the photo field 468. The delete option check box 472 indicates whether the user wishes the photos identified in the photo field 468 to be deleted from the camera 100 after the photos are sent. When the delete option check box 472 is checked, the transport application deletes the photos from storage in the camera 100 after sending them. When the Cancel button 415a is activated, the transport application 230 terminates the send operation and returns control to an appropriate point in the image transport application. When the Store button 476 is activated, the transport application 230 stores information describing the photos, address, and the state of the check boxes 470, 472 in an Out Box. The Out Box is a data structure in the storage device 212 of the camera 100 that contains a list of messages that have been configured for transmission out of the camera but that have not been sent. In such an embodiment, the image transport application may be provided with a Check Out Box option that enables the user to review the contents of the Out Box, select a message, and/or perform other tasks, and resume the transport process. The Send button 462 is used to transport messages in the manner described above with reference to FIG. 4G.

As discussed above, when the Send button 462 is selected, in response, the transport application sends the selected photos to the destination address indicated in the confirmation box 460. One process of sending messages will be described with reference to FIG. 6, which is a block diagram of an image transport system. Camera 100 is coupled through its communication port 214, such as a modem, and telephone line 213 to the public switched telephone network (PSTN) 606. A service provider 600 is logically separated from camera 100. The service provider 600 has a server 601 that is coupled by a modem 604 to the PSTN 606. One or more services 602 are executed by the server 601. The services 602 preferably include a service of receiving and forwarding photos, as described herein. Other services can be provided, as described below.

PSTN 606 and modem 604 represent just one example of a data communication network and a communications interface that can be used to convey information to server 601. Any data communication network or its equivalent, and an interface or the equivalent that can communicate data to or from communication port 214, may be used.

Preferably, the server 601 is coupled to a mass storage device 614. The server 601 is also coupled to a network 608 and to remote devices that are located logically across the network, such as a remote server 610, a printer 612, and other devices. In one embodiment, the network 608 is the global packet-switched data network known as the Internet.

In this context, when the Send button 462 is pressed, the transport application causes the camera 100 to connect to the server 601. For example, communications port 214 takes the telephone line 213 off-hook and dials a pre-determined, stored telephone number corresponding to the number of the modem 604. The server 601 answers the call and establishes a connection to the transport application in the camera 100. In an embodiment, one of the services 602 initiates a process that handles the connection.

The server 601 and the transport application carry out handshaking operations. The server 601 signals the transport application to send photos to it. The transport application sends the selected photos to the server 601, along with the addresses entered by the user and any associated voice message information, in digital form.

In one embodiment, the transport application stores pre-determined information describing the user or owner of the camera 100 in the storage device 212. For example, the user information may comprise a name, address, telephone number, serial number, and passcode. Alternatively, the user information comprises a unique user name and password. In yet another alternative, the user information comprises a public key of the user for use in a public key cryptography process, or a digital signature, or a digital certificate that uniquely identifies the user. The transport application retrieves the user information and sends it to the server 601.

The server 601 receives the user information, photos, addresses, and voice message information, and stores them locally. After all user information, photos and addresses have been received, transport application 230 or one of the other software elements 220 terminates the network connection. Alternatively, or depending on the communication protocol being used, the server 601 terminates the connection. As a result, modem 214 goes on-hook.

Having received the photos, addresses, and voice message information, the server 601 determines what to do with them. In an embodiment, a process of the services 602 examines each address received from the camera 100 and parses the address. When the address is identified as an Internet address in the parsing process, then the service 602 forwards the photos by Internet electronic mail. In particular, the service 602 creates an Internet mail message as a package for the photos. The Internet address is designated as the address for the message. The electronic mail message contains a text greeting identifying the sender. Each digital photo is converted into an image file in a universal file format, such as JPEG, etc. Each image file is attached to the Internet mail message as a file attachment. The service 602 then dispatches the Internet mail message over the network 608.

When the address is identified as a physical address such as a postal mail address, the service 602 prepares a tangible copy of each photo and causes the photos to be sent to the physical address. For example, the service 602 converts each photo into a printable format, and sends each photo in that format to a high-resolution color printer. The service 602 also sends a header sheet to the printer. The header sheet identifies the sender (based on the user information), the addressee, the subject of the message or photos if a subject has been entered by the user, and the number of photos. The header sheet is retrieved from the printer along with the tangible copies of the photos. The header sheet is used as a packing slip. The printed photos are packaged in an envelope and mailed to the address indicated on the header sheet.

A system in this configuration may be integrated with a variety of other services. For example, one of the services 602 can redirect one or more photos received from the camera 100 to a facsimile number that is identified in the address information. In this embodiment, the server 601 is coupled to a fax modem. The service 602 parses the addresses received from the transport application and identifies a fax number among the addresses. The service 602 arranges the photos into a fax format file, and passes it to a fax server that controls and supervises the fax modem. The fax server causes the fax modem to dial the fax number and send a fax transmission containing the photos in the fax format file. Details of such fax forwarding technology are well known and are not described in detail herein to avoid obscuring the invention.

In another embodiment, the services 602 are configured to upload the photos received from camera 100 to a designated server or Web site. In this embodiment, upon receipt of user information, addresses, and selected photos, services 602 parse the addresses and identify a Web site address among them, such as a Uniform Resource Locator (URL). In response, services 602 create a Web document, for example, a file in the hypertext markup language (HTML) format. The selected photos are converted into image files, and the image files are hyperlinked into the HTML file. Services 602 establish a connection to the Web site or Web server that is identified in the addresses, through the network 608. For example, services 602 open an anonymous file transfer protocol (FTP) connection to a Web server that is identified in the addresses. Using the FTP connection, services transfer the HTML file and the image files to the Web server. As a result, digital photos taken by the camera 100 become available worldwide, on a rapid basis, through the network 608 using standard World Wide Web protocols and the foregoing processes.

Other Services

In this configuration, the server 601 may provide services 602 other than image transport. For example, services 602 may also include a registration service in which an owner or user of a camera 100 may register with the server 601 and establish an account on the storage device 614. The camera owner provides name, address, and billing information, such as a credit card number or bank account number, to the registration service. Thereafter, when the camera owner sends photos from the camera 100 to the services 602 for redistribution to addressees, the server 601 charges the designated credit card number or bank account number a transaction fee for the service of forwarding the message.

Services 602 may also include a photo album maintenance service. In the photo album service, a camera owner registers with the server 601 and receives a unique username and password. The camera owner is entitled to store a fixed number of photos on the storage device 614 associated with the server 601. The camera owner may use the camera 100, under control of the transport application 230 or another application, to upload one or more photos to the camera owner's account and designated photo storage area on the storage device 614. Using the transport application or another application, the camera owner may connect to the server 601, retrieve one or more photos that are stored in the owner's account on the storage device 614, and view the photos at the camera. The camera owner may also print any stored photo at any time and transport any photo at any time in the manner described above in connection with transport application 230. Thus, the storage device 614 and services 602 provide a virtual photo album service to the camera owner.

Services 602 may also include novelty product services. For example, the services 602 may include an image printing service. Using the printing service, one or more photos, stored in the storage device 614 or received from the camera 100 using the transport application 230, are printed on T-shirts, coffee mugs, or other products. The printing operations are carried out upon request by an owner of a camera 100 who has an account registered with the server 601. Completed products are shipped to the owner of the camera 100 at the address that is associated with the owner's account, and the owner is billed by credit card charge or other method.

Image Authentication

In one embodiment, the steps carried out in response to selection of the Send button 462 also include an image authentication process.

Preferably, the transport application has an encoding algorithm that can be applied to one or more of the stored images to produce a unique code representative of the image. For example, the transport application has one or more digital signature algorithms that can receive one of the stored images 432a–432c as input, and produce as output a digital signature of the input image. In one embodiment, the digital signature algorithm is a one-way hash algorithm, such as the MD5 algorithm. Digital signature algorithms and one-way hash algorithms are described in detail in B. Schneier, "Applied Cryptography" (2d ed. 1997) (New York: John Wiley & Sons, ISBN 0-471-12845-7).

The encoding algorithm is applied to each photo as the photo exits the camera 100 and is sent to the server 601. Thus, an authenticity stamp in the form of the code is added to each photo upon transmission. If the digital photo is subsequently altered, the code will be invalid. The alteration can be detected by applying the altered image to the same encoding algorithm and comparing the code it generates, and information describing its purported author or source, with the original code attached to the image, and information identifying the author of the image or the camera that produced the image. If the codes do not match exactly, alteration has occurred.

In one embodiment, the encoding algorithm uses a public key cryptography technique. Schneier describes public key cryptography in detail in the above-referenced work. In this configuration, a public key of the server 601 and a public key of the owner of the digital camera 100 are stored at server 601 in association with the owner's account, or information describing the owner or information describing the camera. A private key is stored in the camera in a manner that prevents recovery of the private key. For example, the private key is embedded in firmware in the camera. The private key in the camera 100 is used by the transport application 230 as one parameter for the encoding algorithm. Using the private key and the encoding algorithm, the plaintext of an image is converted into ciphertext and then transported to the server 601 in the manner described above. At the server 601, the plaintext of the image can be recovered using the camera owner's public key.

In this embodiment, the encoding algorithm provides a way to associate a particular camera 100 or owner with each image. Thus, using this information, the server 601 or another party can determine not only whether an image is authentic, but can also determine who or what camera created the image. Moreover, due to the mechanics of public key cryptography, even if the private key in a particular camera is obtained by a malicious party, that private key cannot be used to decrypt or apply false authentication stamps to image created by other cameras or other persons.

Hardware Overview

Figure 7:
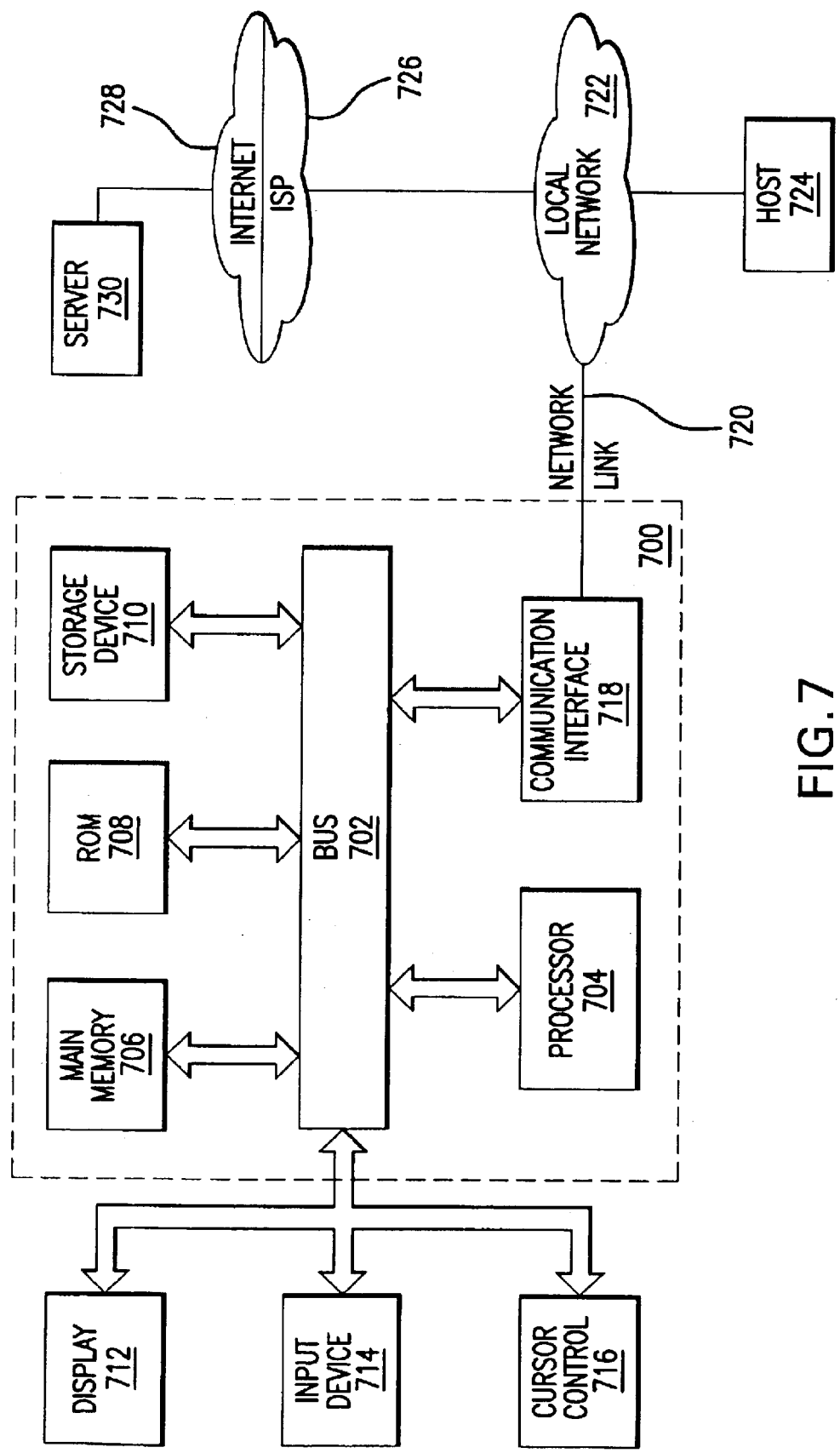
FIG. 7 is a block diagram of a computer system that can be used to implement an embodiment of the invention.

FIG. 7 is a block diagram that illustrates a computer system 700 upon which aspects of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is a cursor control 716, such as a mouse, a trackball, or cursor direction keys for communicating direction information and command selections to processor 704 and for controlling cursor movement on display 712. This input device typically has two degrees of freedom, that allow the device to specify positions along a first axis (e.g., x) and a second axis (e.g., y) in a plane.

The invention is related to the use of computer system 700 for image transport and authentication. According to one embodiment of the invention, image transport and authentication is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wires and fiber optics, including the wires that comprise bus 702. Transmission media can also take the form of acoustic or light waves, such as those generated during radio-wave and infrared data communications.

Common forms of computer-readable media include, for example, a floppy disk, a flexible disk, a hard disk, magnetic tape, many other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, and any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722 For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for image transport and authentication as described herein.

The received code may be executed by processor 704 as it is received, and/or stored in storage device 710, or other non-volatile storage for later execution. In this manner, computer system 700 may obtain application code in the form of a carrier wave.

Network Architecture

Figure 8:
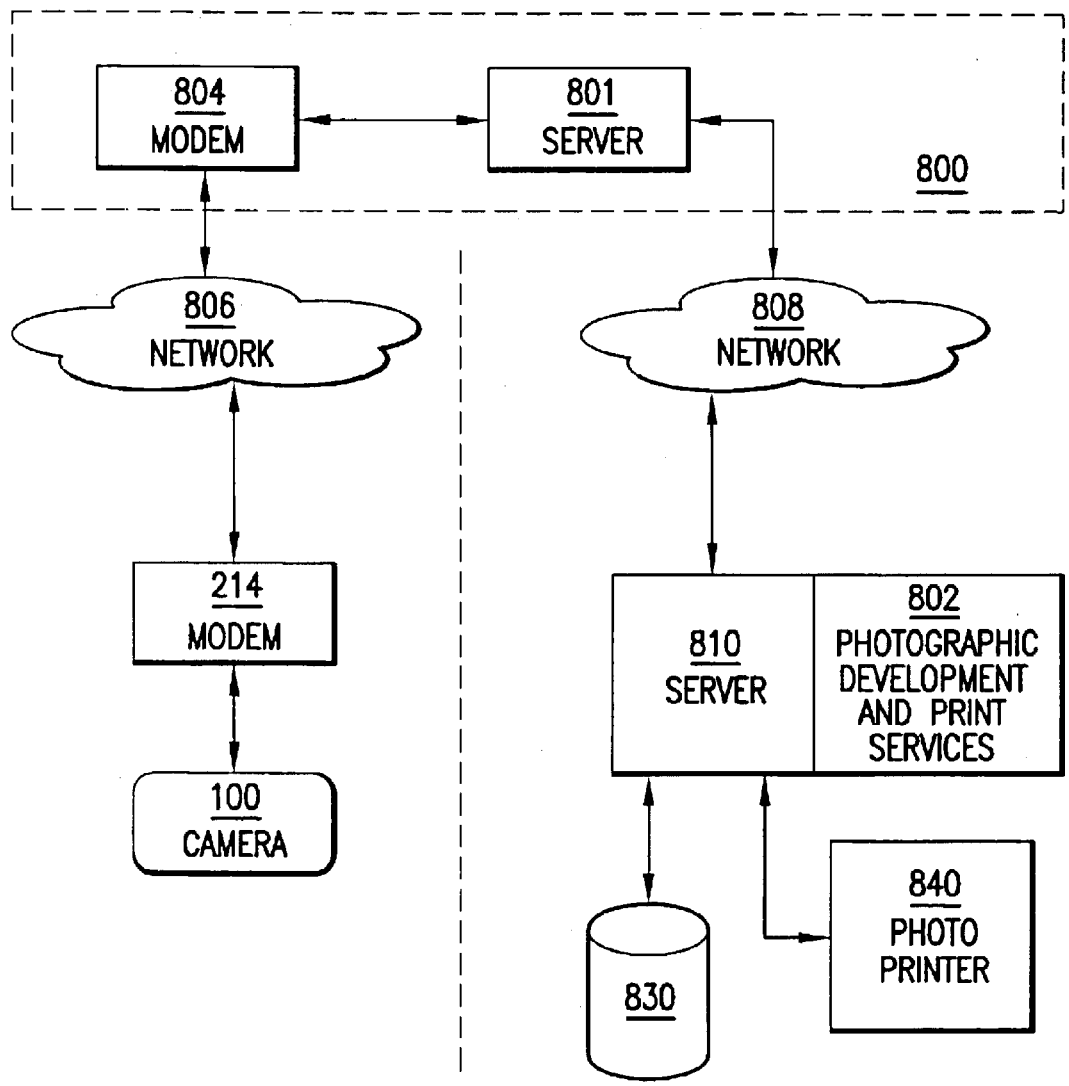
FIG. 8 is a block diagram of an embodiment of an image development system.

FIG. 8 is a block diagram of a remote image development, printing and transport system. Camera 100 communicates through an internal or external modem 214 with network 806, which may be the public switched telephone network or any other type of voice or data network. A service provider 800 is coupled to network 806 at a location logically separate from camera 100. In an embodiment, service provider 800 is an Internet Service Provider that communicates with camera 100 using standard Internet data communication protocols, such as TCP/IP, over network 806. In such an embodiment, a user of camera 100 has access to an account with service provider 800. The user may utilize the account, for example, for World Wide Web or Internet access using a personal computer or workstation.

Service provider 800 has one or more modems 804 that are compatible with modem 214. Service provider 800 has one or more servers 801 that provide data communication services to clients of the service provider. For example, server 801 can be a Hypertext Transfer Protocol (HTTP) server or an anonymous file transfer protocol (FTP) server. Using software elements 220 (see FIG. 2), which may include a web browser, other HTTP client, or FTP client, camera 100 can establish an HTTP connection, an FTP connection, or another type of connection over network 806 to service provider 800. Although modem 804 is illustrated in FIG. 8 as a single block, it may include a modem bank that has many modems for serving many simultaneous connections. It may also include network access servers, AAA servers, firewalls, etc.

Server 801 of service provider 800 is also coupled to a data network 808. In an embodiment, networks 806, 808 are integrated into one network. In an alternate embodiment, they are separate networks.

A photographic service provider, such as a photo development business, photograph or film processing business, camera shop, or other service bureau ("photo service provider"), can be located logically separate or remote from the service provider 800 and the owner of camera 100. A server 810 that provides photographic development, or printing services, or both 802 is coupled to network 808 in a position that is logically separate from service provider 800 and camera 100. The photo service provider provides development, printing and/or transport services for photographic prints or other photographic elements such as negatives, internegatives, interpositives, motion picture film, etc., that are produced based on digital images, to a user of camera 100.

For example, using software elements 220, a user may establish an FTP connection between camera 100 and server 810. Using the user's account at service provider 800, the user uploads one or more digital images taken by camera 100 to server 810. The user may also have an account on server 810. Server 810 is coupled to a photographic printing machine 840 that is loaded with unexposed photographic paper. In this context, "photographic printing machine" refers to a photo laboratory-quality machine that can produce images on photographic paper, rather than a consumer-grade inkjet printer, plain paper color printer, laser printer, etc. The server 810 sends digital image data to the photographic printing machine 840 together with commands that instruct the machine about how to print the images. The photographic printing machine 840 has software elements that can interpret the commands and produce a photographic print based on the commands and the digital images. The photographic printing machine 840 prints one or more copies of the digital images on photographic paper of one or more sizes. An example of a photographic printing machine that is suitable for this purpose is the Chromapress 32Si produced by the Agfa-Gevaert Group ("Agfa").

In an embodiment, server 810 has a database 830. Database 830 stores one or more account records for users of cameras 100 who maintain accounts at server 810. Database 830 may store the account records itself or may provide pointers to the directory structure of server 810. For example, each account-holder can have a directory within the file system of server 810. Each directory stores one or more digital images. Each digital image can be stored in wavelet form. Server 810 converts the digital images from wavelet form to "thumbnail" format in a display format, such as the Graphical Interchange Format (GIF). Server 810 may also convert the digital images from wavelet form to other graphical formats for external use, such as GIF, JPEG, TIFF, etc.

Database 830 may also store user authentication information that is uniquely associated with a specific user or a particular camera 100 for security purposes. The user authentication information may comprise, for example, a username and a password. In an embodiment, this information may be provided by camera 100 at the time that an FTP connection is requested. Server 810 opens an FTP connection to camera 100 only if the camera provides the correct username and password information. Thus, server 810 enforces access control measures so that only authorized users may access information in server 810 or a particular account of the server.

Services

Services 802 may carry out a variety of actions. For example, in response to a request by software elements 220, services 802 cause an uploaded digital image to be printed on the photographic printing machine 840, resulting in creation of one or more photographic prints. The prints are delivered to a third party addressee that is specified by the user of camera 100, according to address data associated with the image and sent to server 810 with the image. Delivery may be by postal mail, courier, etc. Alternatively, the prints are delivered to the user of camera 100. In another alternative, services 802 forwards the prints to an external service provider or fulfillment organization for further processing. The external service provider might offer manual image enhancement, preparation of poster-size prints or other specialty items, bulk image storage, etc. Services 802 are carried out through cooperation of software elements 220 and other software elements of server 810 that are executed by server 810 to provide the services 802.

In an embodiment, the software elements 220 of camera 100 may generate the menu displays of FIG. 9A through FIG. 9D and FIG. 10 and cooperate with software elements executed by server 810 to carry out services 802. The displays of these figures are described below in connection with FIG. 11A through FIG. 11E, and FIG. 12A through FIG. 12C.

Figure 11A:
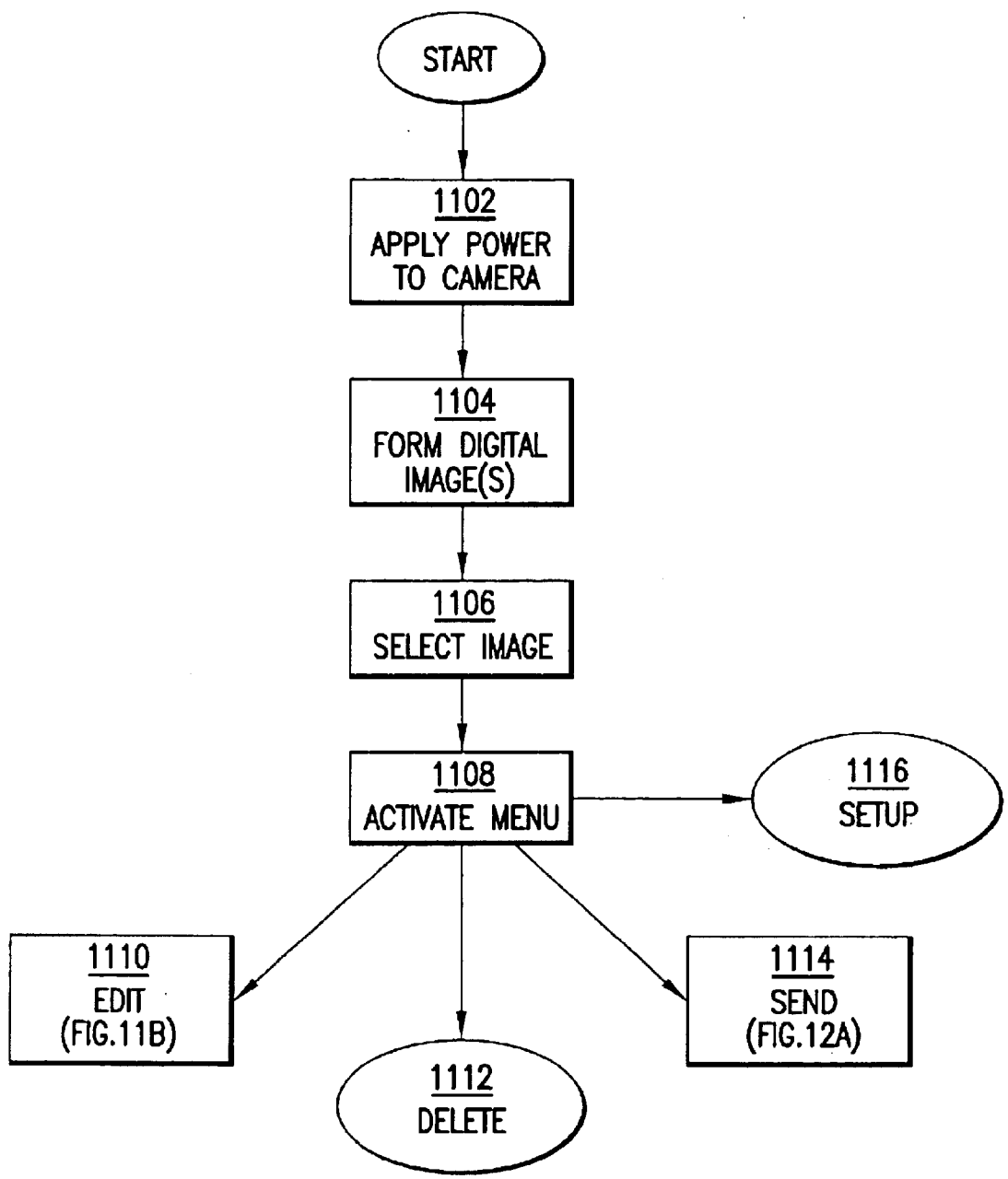
FIG. 11A is a flow diagram of a process of using a digital camera.

FIG. 11A is a flow diagram of a method of using a digital camera that may be carried out by software elements 220 when executed by camera 100. In one embodiment, camera 100 includes a power button for applying power to the camera, and a shutter button for exposing camera electronics to light and forming images. In another embodiment, camera 100 has a five-position rocker control that may be pushed or rocked up, down, left, and right, and which also has a centrally disposed selection button. Software elements 220 can sense selection of the rocker control in any of the five positions and respond appropriately. In one embodiment, camera 100 also has a MENU button which, when pressed, causes the camera to display a menu of command options in the camera display, superimposed over an image that has been taken with the camera. The display of camera 100 may be a touch-sensitive display that is used in conjunction with a stylus.

In block 1102, power is applied to camera 100. Block 1102 may involve the steps of turning on the camera 100 or installing a battery and activating a power-on button. In block 1104, one or more digital images are formed.

Block 1104 may involve exposing the image-forming electronics of camera 100 to light one or more times, as by pressing the shutter button of camera 100. One or more digital images are thereby formed by the camera and stored in its memory for later use, viewing or manipulation.

In block 1106, one of the images is selected for an operation or a service such as editing, deleting, or sending for remote development, printing, and forwarding. In an embodiment, the camera 100 displays a first image, and a user may cause the camera to display an earlier taken image or a later taken image, respectively, by moving a rocker control of the camera left or right.

Once a desired image is displayed by the camera 100, the user may activate a menu of services options, as shown by block 1108. In an embodiment, the menu is activated by pressing the MENU button on the camera. In response, software elements 220 display a menu of the form shown in FIG. 9A, superimposed over the current image.

Figure 9A:
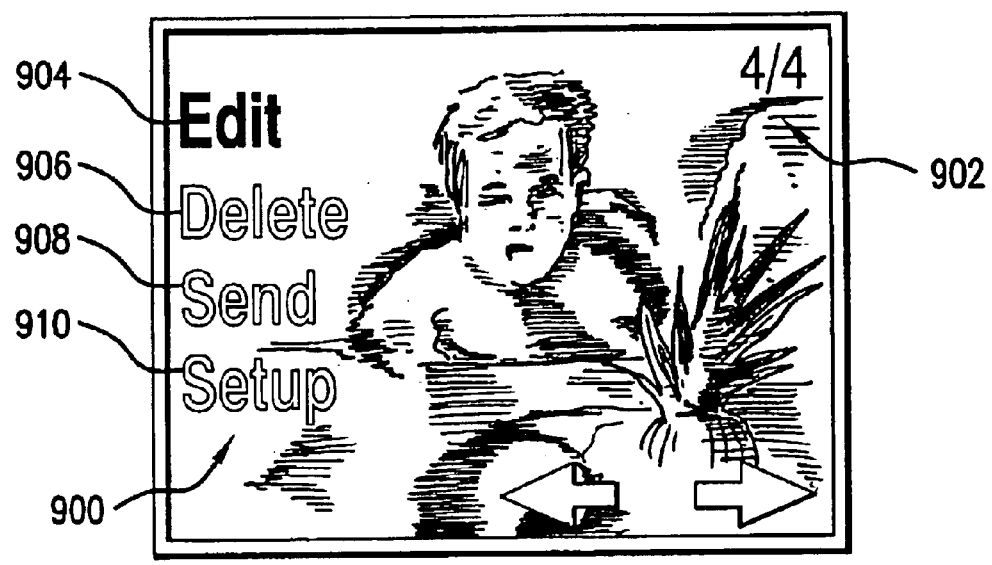
FIG. 9A is a diagram of an image options screen.

FIG. 9A is a diagram of a top-level menu 900 of services that may be displayed by camera 100. Menu 900 includes an image description line 902 that identifies the sequence number of the current image, such as image number "4" among "4" total images stored by the camera 100. Although not shown, the image description line 902 may also include a title of the current image and the date on which the image was taken. Menu 900 also may include one or more menu option labels, such as an Edit label 904, Delete label 906, Send label 908, and Setup label 910. Menu 900 may also include up and down graphical buttons and menu traversal option labels such as a Back label and a Next label (not shown).

By default, Edit label 904 is highlighted and indicates the default selection from menu 900. A user may select a different menu option by touching up and down graphical buttons with a stylus, when such buttons are supplied, or by moving the rocker control, or through another selection method. In an embodiment, selecting a label and holding a stylus on it, or holding the rocker control so as to select it, causes camera 100 to display a help text description near an associated label. For example, holding a stylus on the Edit label 904 may cause camera 100 to display the phrase, "Select to enhance this picture." The help labels assist the user in remembering what functions are carried out by each option.

As indicated by block 1110, block 1112, block 1114, and block 1116, the main menu may be used to select Edit, Delete, Send, and Setup options.

Edit

Figure 11B:
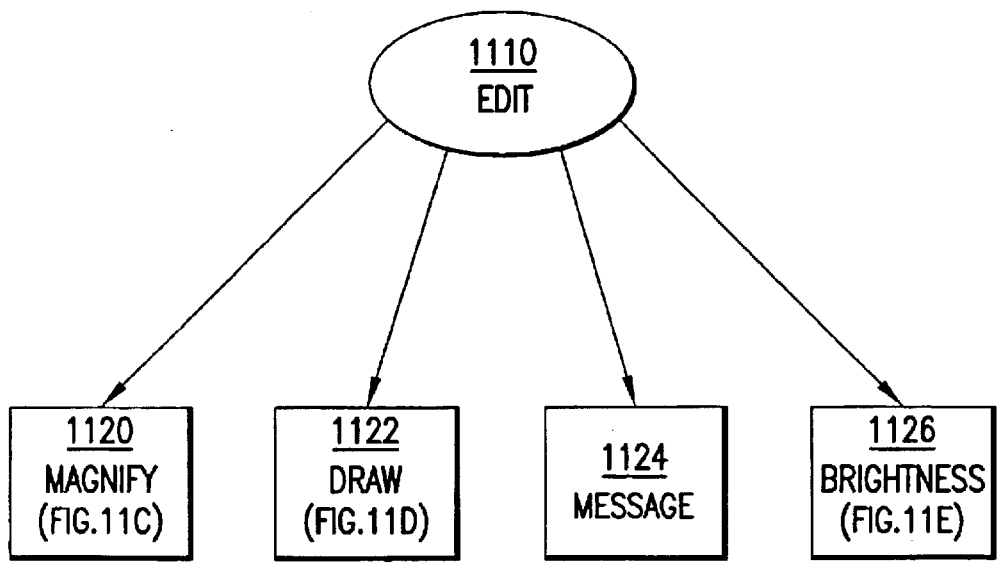
FIG. 11B is a flow diagram of an EDIT process.

FIG. 11B is a flow diagram of a process of carrying out the Edit option. When the Edit label 904 of FIG. 9A is selected, in response, camera 100 may display a menu of image editing options such as shown in FIG. 9B.

Figure 9B:
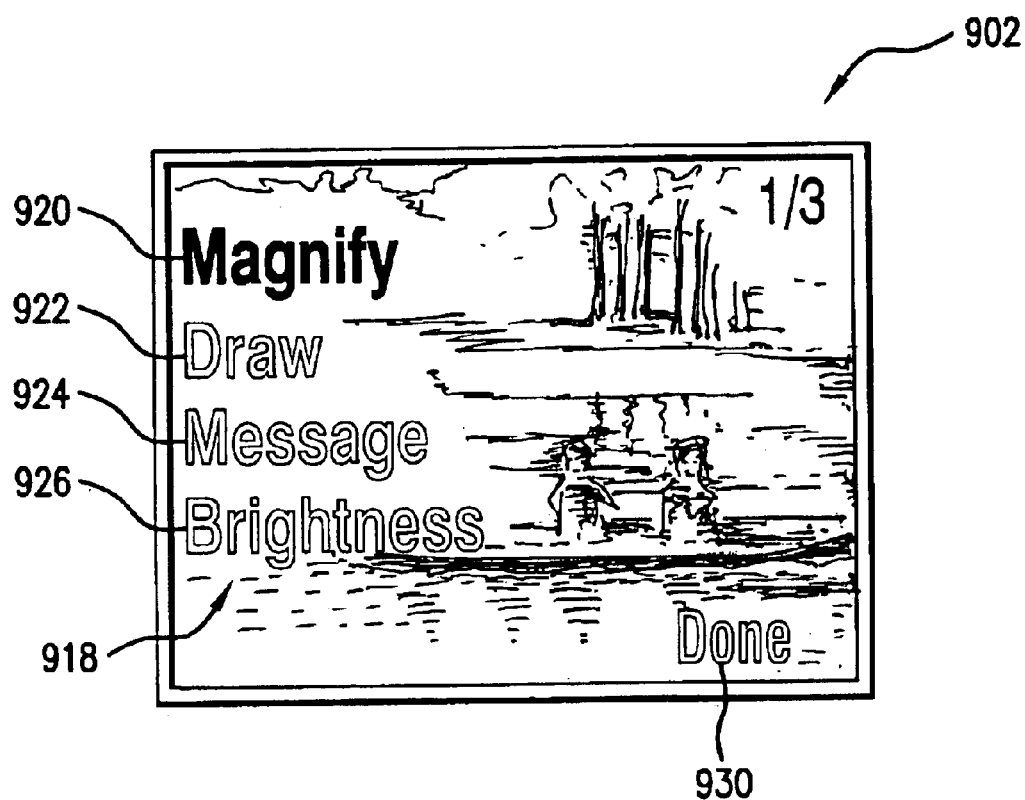
FIG. 9B is a diagram of an Edit options screen.

FIG. 9B is a diagram of an edit menu 918 that may be displayed in an embodiment when Edit label 904 is selected. Edit menu 918 displays the same image description line 902 as in FIG. 9A so that the user may retain a sense of context. Edit menu 918 may include a Magnify option 920, a Draw option 922, a Message option 924, and a Brightness option 926. Edit menu 918 also includes a Done option 930, and, although not shown, can further include a Cancel option and/or 928, Back option. Each of the options may be displayed in the form of a text label or graphical button, and each of the options may be selected by moving a cursor to the desired option using the rocker, by touching a finger or stylus to the desired option, or by some other selection method.

Selection of the Done option 930 terminates Edit processing, and makes any changes to the image persistent by saving the altered image in camera memory. When included, selecting the Cancel option 928 can cause software elements 220 to display menu 900 of FIG. 9A. Thus, the Cancel option discontinues Edit processing without taking action on the image. When the Back option is included, its selection can cause software elements 220 to return to the previously displayed menu. If the Back option is selected from Edit menu 918, it would have the same effect as the Cancel option; however, when the Back option is selected from subsequent screens, the immediately preceding screen is displayed.

Figure 11C:
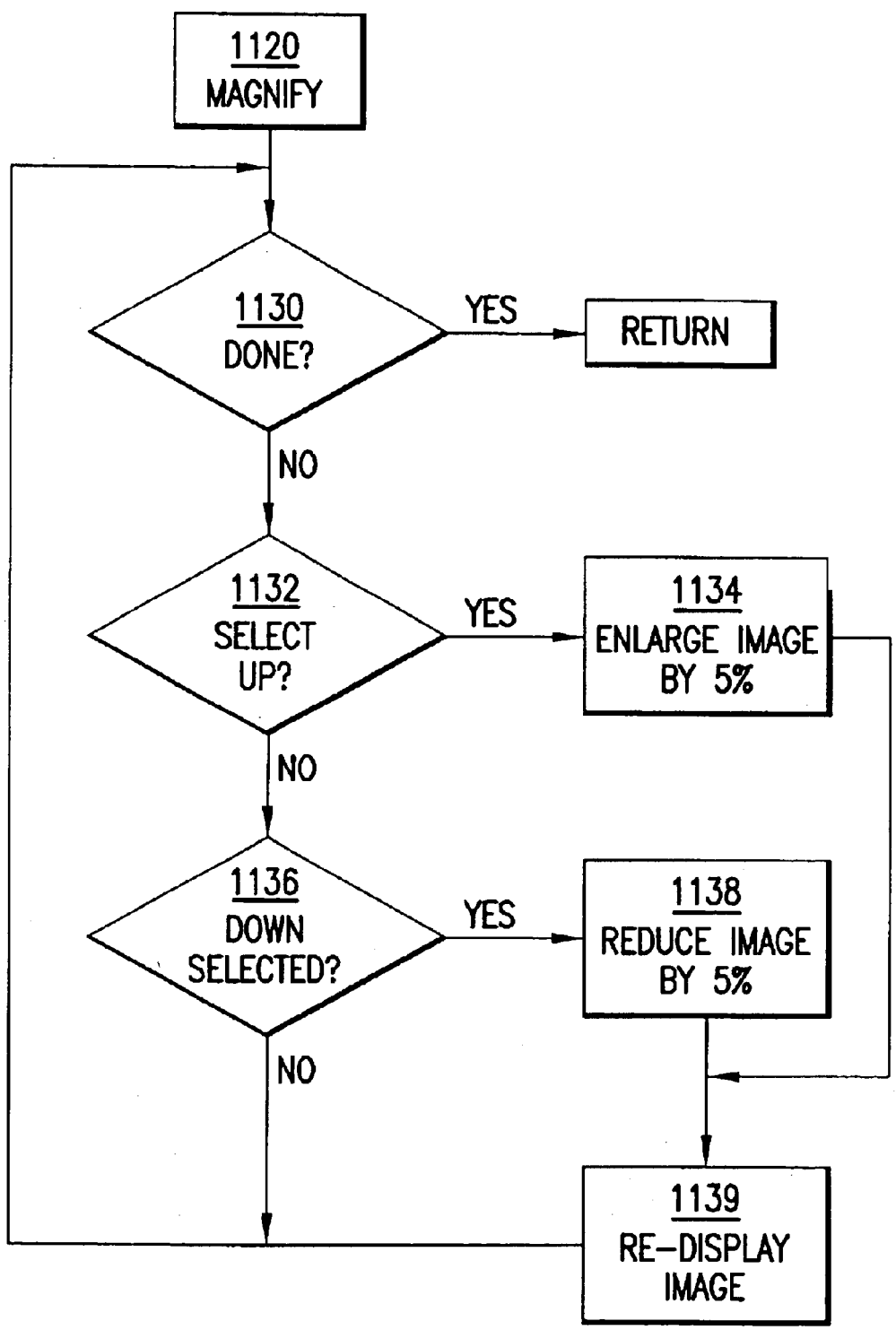
FIG. 11C is a diagram of a ZOOM process.

FIG. 11C is a flow diagram of processing steps that may be carried out in connection with Magnify option 920. In an embodiment, the Magnify option 920 enables a user to zoom in to or zoom out from an image in increments of 5%. Selection of increasing or decreasing magnification can be made using various selection methods, such as those discussed herein. For example, the rocker control can be moved up or down, to indicate a zoom-in operation or a zoom-out operation, respectively.

In block 1130, the process tests whether the Done option 930 has been selected. If so, then the process returns, for example, to a calling process. If the Done option 930 is not selected, then in block 1132 the process tests whether zoom-in (i.e., increase size) has been selected. Selection of zoom-in may be carried out by moving the rocker control in the up direction. If zoom-in is selected, then the image is digitally zoomed in by 5% and re-displayed in the display of the camera 100, as shown by block 1134 and block 1139. The options of FIG. 9B remain displayed, superimposed over the zoomed image. Similarly, as shown by block 1136 and block 1138, camera 100 senses selection of zoom-out and responds by zooming the image out.

Figure 11D:
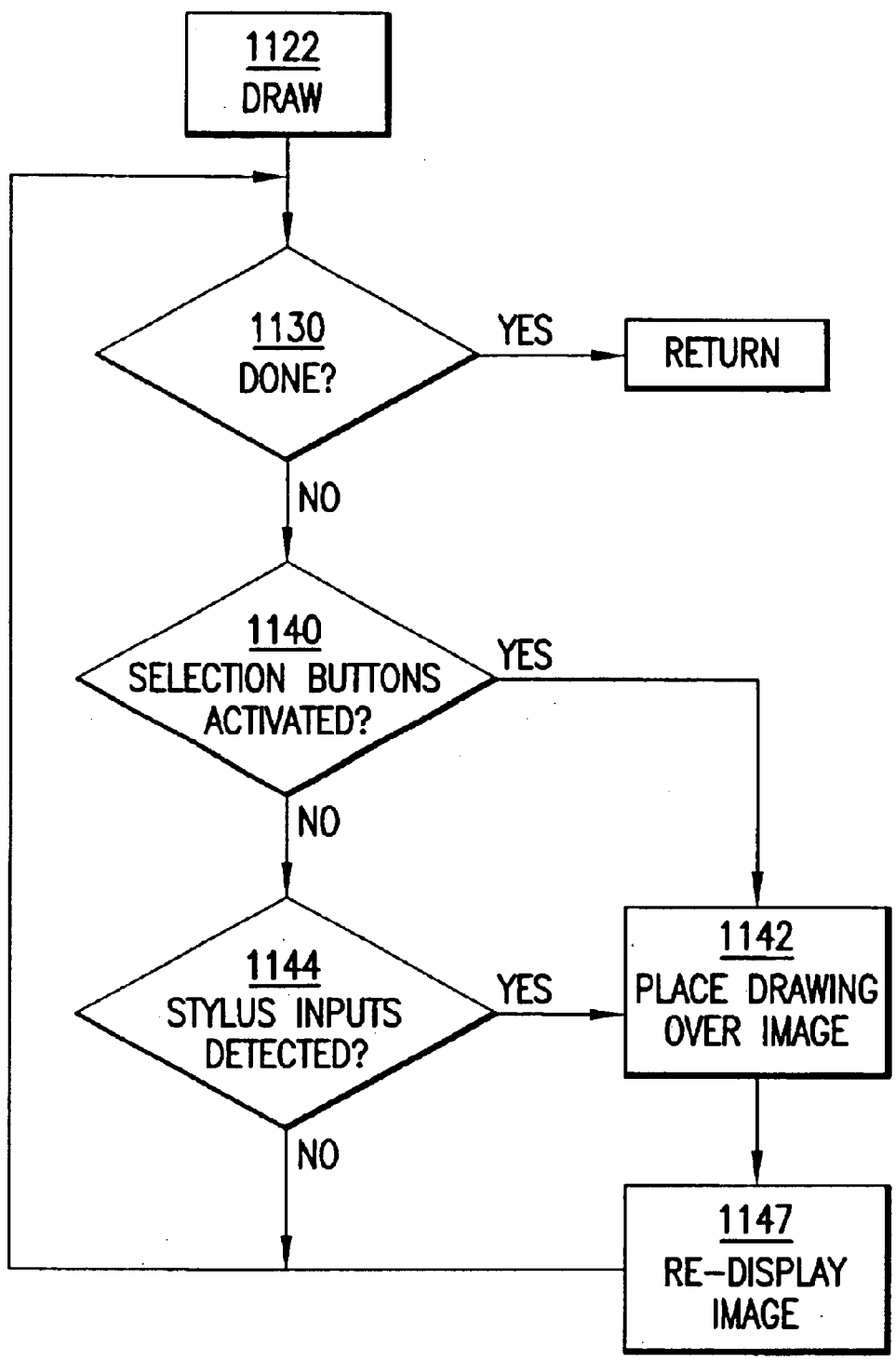
FIG. 11D is a diagram of a PAN process.

FIG. 11D is a flow diagram of processing steps that may be carried out in connection with Draw option 922. In an embodiment, the Draw option 922 enables a user to add a drawing to the current or selected image. For example, a drawing can be selected from stored drawings, or a drawing can be specified by the user.

In block 1130, the process tests whether the Done option 930 has been selected. If so, then the process returns, for example, to a calling process. If the Done option 930 is not selected, then in block 1140 the process tests whether one or more displayed selection buttons (not shown) have been selected. The selection buttons can each correspond to one or more stored drawings. If a selection button is not activated in block 1140, in block 1144 it is determined whether a stylus, finger, or other suitable input is detected. Such input can be in the form of moving the stylus, finger, or the like over the image in the location and pattern of the desired drawing. In addition or alternatively, the rocker button can be used to input a drawing. If either a selection button is activated in block 1140, or a detection is made in block 1144, the corresponding drawing is placed over the image in block 1142. In block 1147, the image is re-displayed, after which the process returns to block 1130.

The Message option 924 may be used to enter a text annotation for the current image. The text annotation is stored in camera 100 in association with the current image, and transported with the image when the image is emailed, transferred by FTP transfer, etc. As an example, the Message option 924 can operate as described above with reference to FIG. 4F.

Figure 11E:
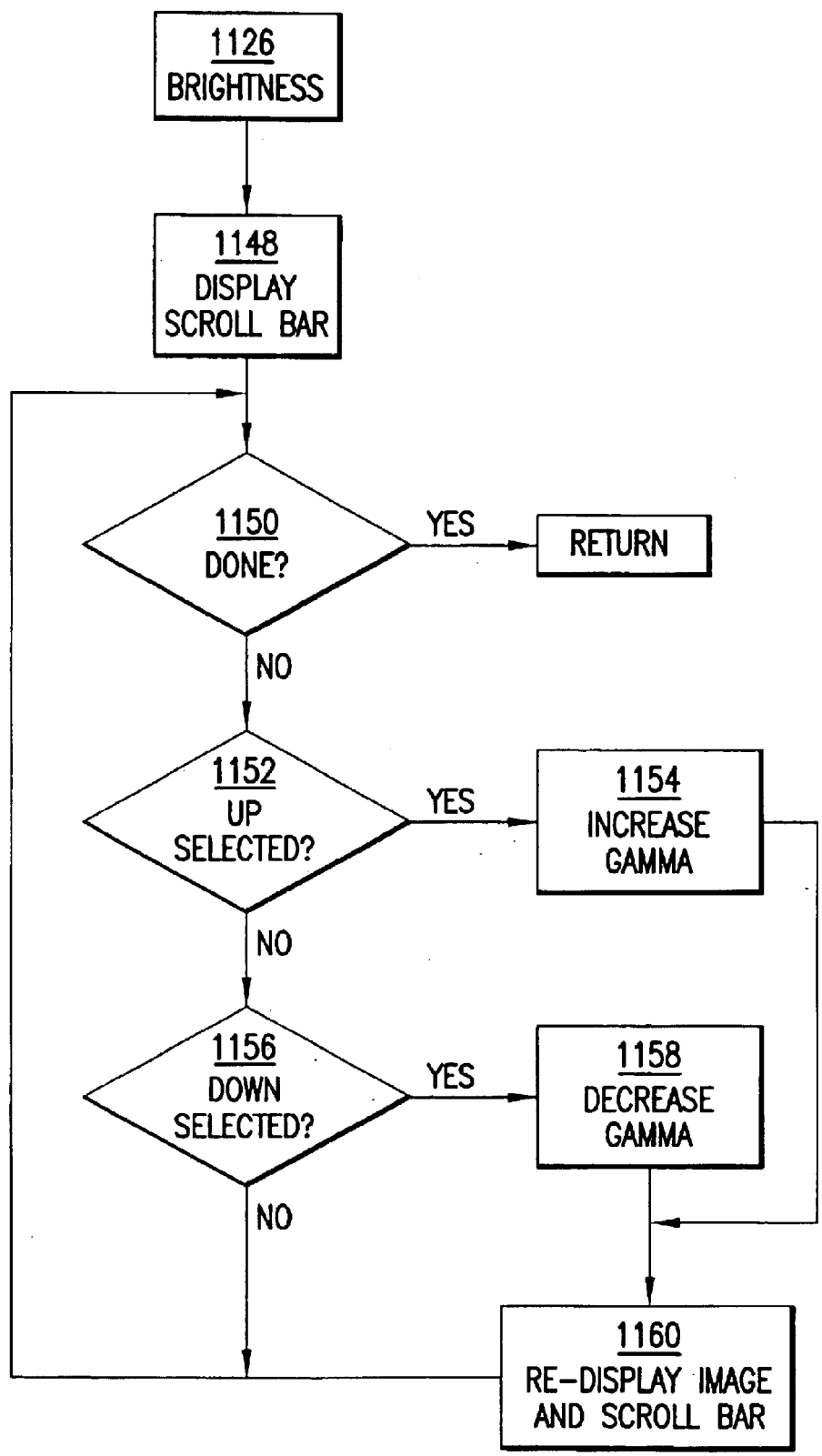
FIG. 11E is a diagram of a BRIGHT process.

FIG. 11E is a flow diagram of processing steps that may be carried out in connection with Brightness option 926 of FIG. 9B. In an embodiment, the Brightness option 926 enables a user to increase or decrease the brightness of the current image (i.e., its "gamma" value) in pre-determined increments. Such increase or decrease can be selected by any suitable selection method, for example, by using a finger or stylus to select one of two arrows, or a position on a bar indicating lesser and greater brightness. As a further example, the rocker control can be moved up or down, to indicate an increase or decrease, respectively, in the gamma value of the current or selected image.

In block 1150, the process tests whether the Done option 930 has been selected. If so, then the process returns, for example, to a calling process. If the Done option 930 is not selected, then in block 1152 the process tests whether a gamma increase (e.g., UP) has been selected. Selection of a gamma increase may be carried out by moving the rocker control in the up direction. If a gamma increase is selected, then software elements 220 cause the gamma value of the current image to be increased by a pre-determined value, and the image is then re-displayed in the display of the camera 100, as shown by block 1154 and block 1160. The options of FIG. 9B remain displayed, superimposed over the adjusted image. Similarly, as shown by block 1156 and block 1160, camera 100 senses selection of a gamma decrease (e.g., DOWN) and responds by decreasing the gamma value and re-displaying the image.

Although not shown, the main menu 900 of FIG. 9A can also include a Pan option. In an embodiment, the Pan option can enable a user to pan the current image left or right in pre-determined or user-defined increments. The rocker control can be moved left or right to indicate a pan-left operation or a pan-right operation, respectively.

In an exemplary embodiment, the Pan process tests whether the Done option 930 has been selected. If so, then the process returns, for example, to a calling process. If the Done option 930 is not selected, then the process tests whether a LEFT movement has been selected. Selection of a LEFT movement may be carried out by moving the rocker control in the left direction. If LEFT is selected, then the image is panned or shifted left by a pre-determined or user-specified number of pixels or image elements, and re-displayed in the display of the camera 100. The options of FIG. 9B remain displayed, superimposed over the panned image. Similarly, camera 100 senses selection of a RIGHT movement and responds by panning the image in the rightward direction.

In the processes of FIG. 11C, FIG. 11D, and FIG. 11E, a finger, stylus, or the like, or any other suitable selection method may be used to indicate option selections, rather than the rocker control.

Send

Figure 12A:
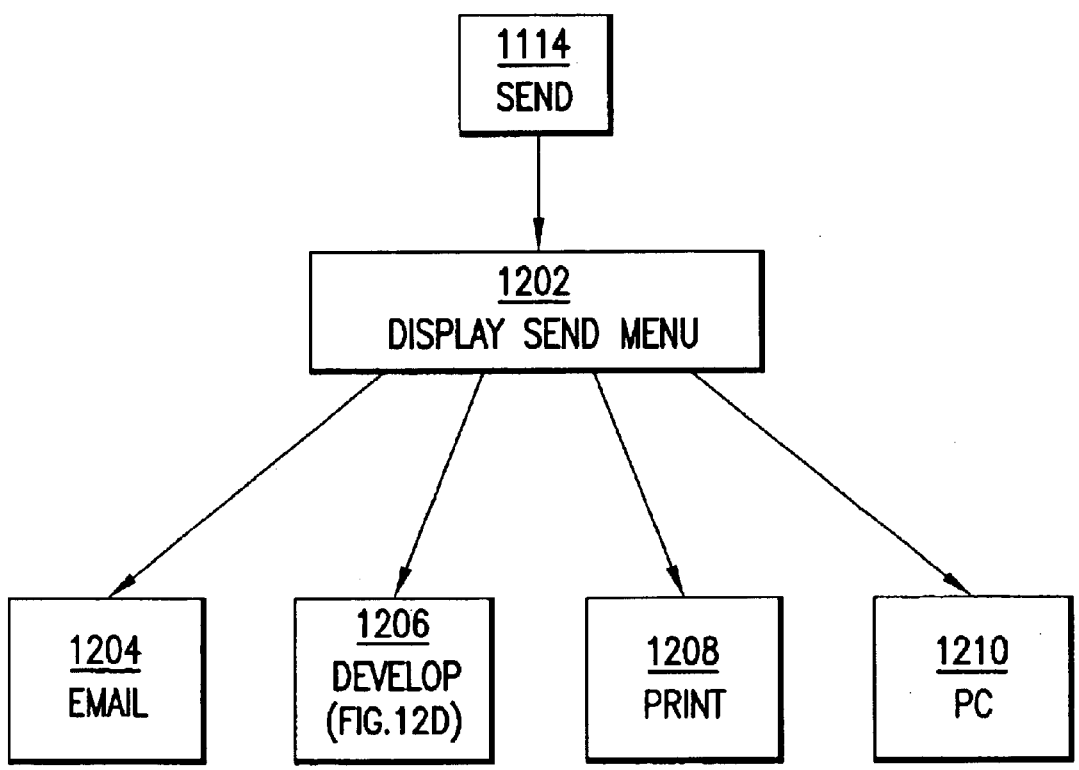
FIG. 12A is a flow diagram of an image sending process.

FIG. 12A is a top-level view of a process that may be carried out when Send option 908 of FIG. 9A is selected, for example, at block 1114 of the process of FIG. 11A. When the Send option 908 is selected, camera 100 displays a Send menu superimposed over the current image, as indicated by block 1202. For example, as shown in FIG. 4A, camera 100 displays a Send menu 932 that includes an Email option 406a, a Develop option 406b, a Print option 406c, and a PC option 406d. A user may select an option by touching a stylus to the name of the option on the display of the camera or by using the rocker control, or by any other suitable method. In response to selection of one of the options, camera 100 carries out steps associated with the selected option, as indicated in FIG. 12A by Email option 1204, Develop option 1206, Print option 1208, and PC option 1210.

In an embodiment, Email option 496a may carry out the transport application as described further above with reference to FIGS. 3A–C, FIGS. 4A–G, and FIG. 5. FIG. 3A is a process diagram of a method 300 for transporting an image in the form of an email.

Figure 6:
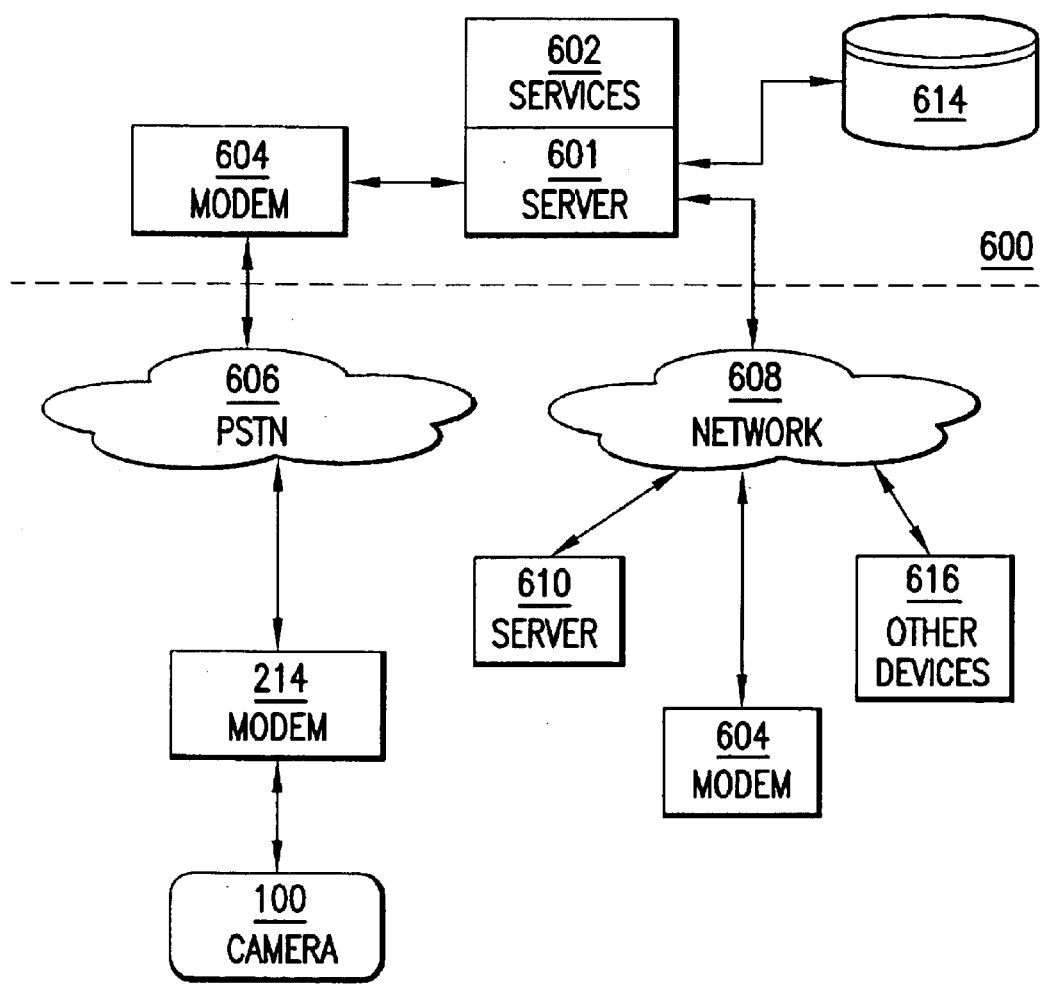
FIG. 6 is a block diagram of an image transport system.

The Print option 406c may carry out an image printing service as described further above with reference to FIG. 6. The PC option 1210 may involve steps that enable a user to transfer one or more digital images from camera 100 to a personal computer, workstation, or other electronic device.

Figure 12B:
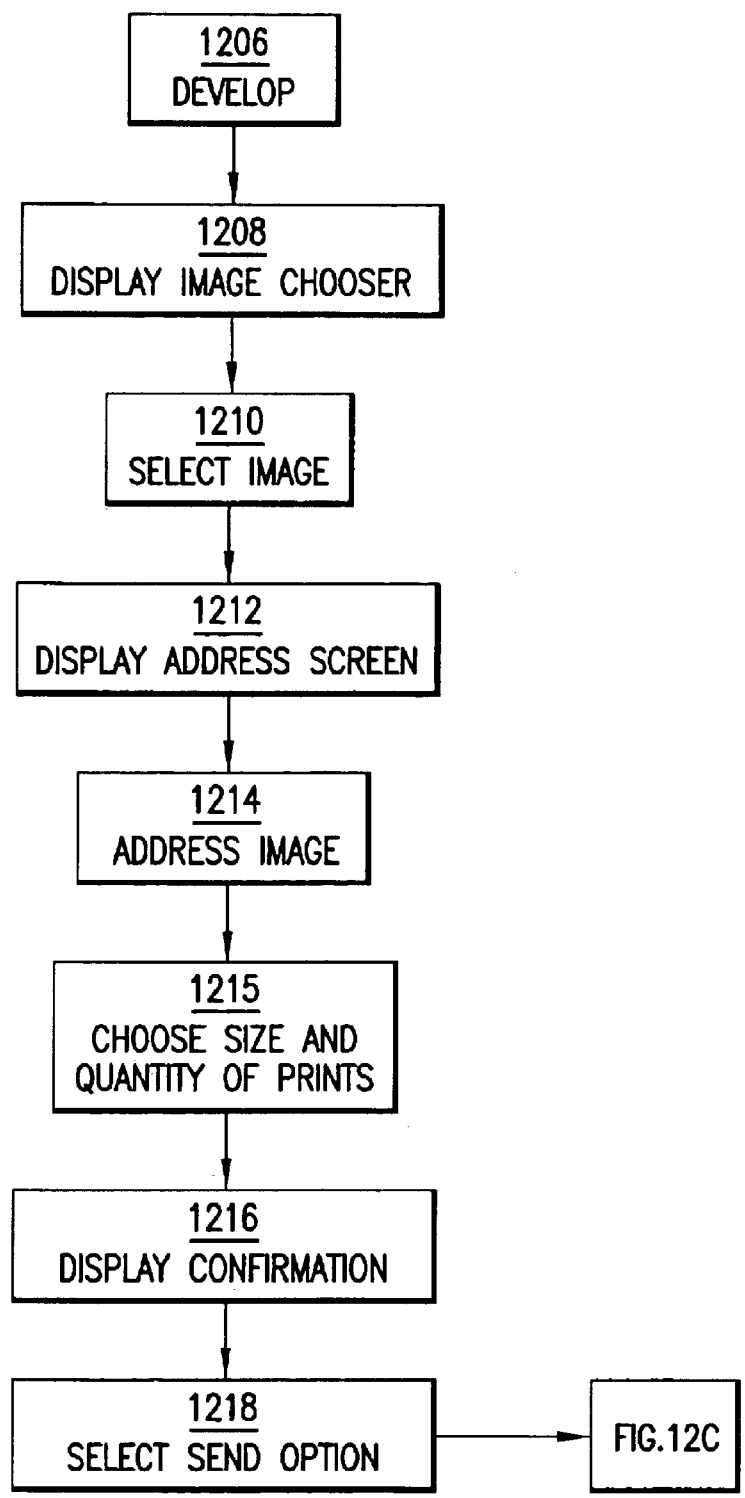
FIG. 12B is a diagram of steps in a process of remote image development.

FIG. 12B is a flow diagram of steps that may be involved in an embodiment of Develop option 406b. The steps of FIG. 12B are initiated when a user selects the Develop option 406b using the rocker control, stylus, or other selection method. In this context, "Develop" refers to virtual development of a digital image, that is, transport of a digital image from camera 100 to some external storage and service location for remote storage, photographic processing, printing, or forwarding.

In block 1208, an image chooser is displayed. The image chooser may be a graphical panel that displays one or more images that are stored in the camera. The specific form or format of the image chooser are not important, provided that the user may conveniently select an image from among all the images stored in the camera. Any image selection method or mechanism may be used. FIG. 4E is an example of a photo select screen 430 that camera 100 may display at block 1208. Photo select screen 430 includes a counter field 438 that indicates the sequence number of the currently selected image. One or more thumbnail images 432a–432c are provided in photo select screen 430. Each of the thumbnail images 432a–432c is a reduced size version of a digital image previously taken with and stored in association with camera 100.

In block 1210, an image is selected from among all the images stored in the camera. For example, in an embodiment, photo select screen 430 may include a scroll bar with which a user may traverse among the images 432a–432c to select one of the images as the current image. The current image is indicated by a colored frame around the image, or by any other suitable form of highlighting or other indication that one image is selected. As the scroll bar is moved, the colored frame can moves from image to image. Alternatively, the colored frame can be applied to those thumbnail images that are positively selected, as further described above with reference to FIG. 4E.

Figure 9C:
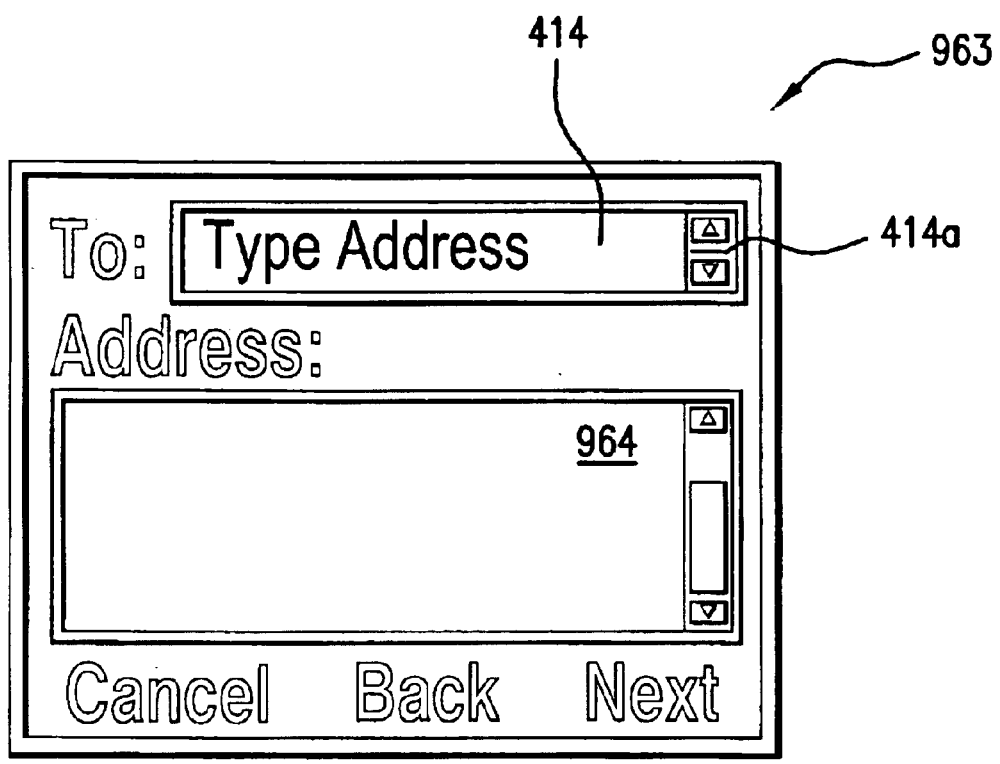
FIG. 9C is a diagram of an addressing screen generating during an addressing step of the Edit application, according to an embodiment.
Figure 9D:
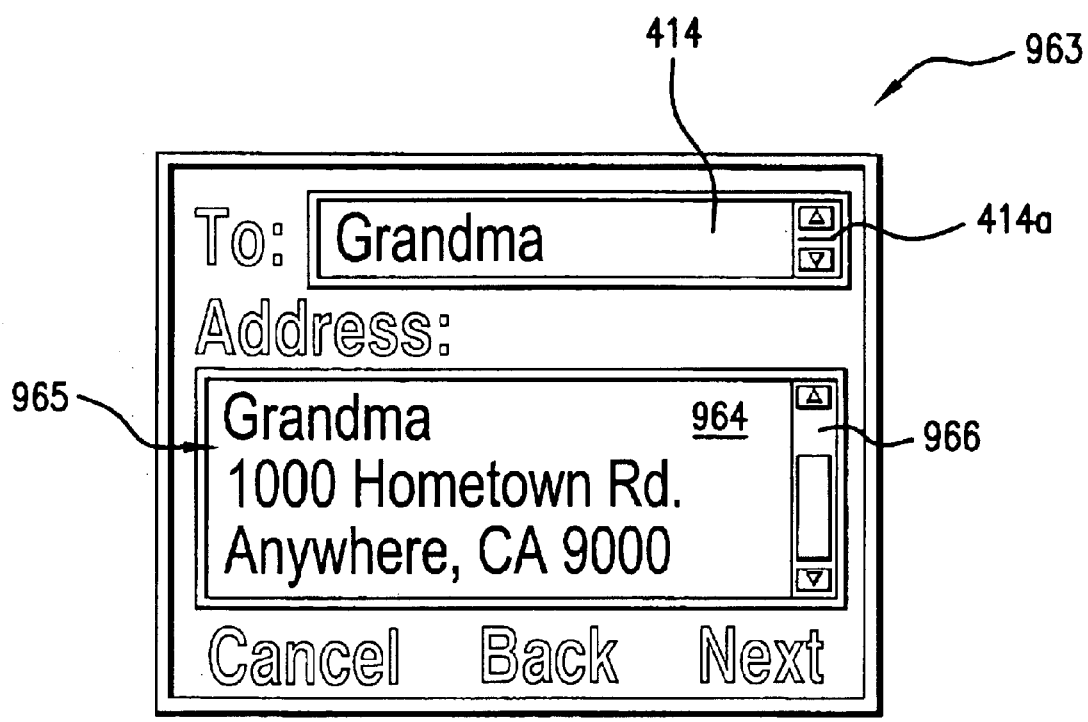
FIG. 9D is a diagram of a completed address screen generated during an addressing step of the Edit application.

In block 1212, an addressing screen is displayed. For example, in an embodiment, camera 100 displays addressing screen 963 as shown in FIG. 9C. Addressing screen 963 includes a "TO:" field 414 into which a user may enter an address of a person or system to which the current digital image is to be sent. Preferably, the "TO:" field 414 is automatically made current or highlighted so that any subsequent data entry will appear in that field. Addressing screen 963 also includes an address list (not shown) accessible through a scroll bar 414a, with which a user may select a previously stored address. Alternatively, an address list can be displayed, with or without a scroll bar, in the addressing screen 963.

In block 1214, the current image is addressed. In an embodiment, an image may be addressed by a user. The user may select one of the addresses and cause it to be entered in the "TO:" field 414 by selecting it using scroll bar 414a. Alternatively, if the desired addressee is not shown in the address list, the user may enter an address using a virtual keyboard of the type shown in FIG. 4C. In one embodiment, the user may display the virtual keyboard 416 by pressing the center button of the rocker control; in response, camera 100 displays the virtual keyboard. The user may then enter the address by moving the rocker control to select letters of the alphabet from the virtual keyboard 416. In an alternate embodiment, the user selects letters of the alphabet from the virtual keyboard 416 by selecting each letter using a stylus, finger, or the like. Either the full address of the addressee, or the addressee name alone can be entered into the "TO:" field 414.

If only the addressee name is entered in the "TO:" field 414, the user may also enter the postal mail address or email address of the addressee in one or more separate data entry fields, such as the Address field 964. After the name is entered in the "TO:" field 414, the other data entry fields are accessed by moving the rocker control or using a stylus, finger, or the like. Data in all the fields is stored in association with the image.

FIG. 9C is a diagram of an addressing screen 963 that is displayed when a complete address has been entered or when a previously stored address has been selected using the address list. Addressing screen 963 includes an address field 964 that shows the complete address 965 that will be used to send the current image. The user may scroll through the address information using a scroll bar 966 to confirm that the information is correct. At any time, the user may return to addressing screen 963 of FIG. 9C or virtual keyboard 416 by pressing the center button of the rocker control, or by signaling camera 100 or software elements 220 in some other appropriate manner.

In yet another alternative embodiment, name and address information may be entered in the form of a second digital image. For example, the user may take a digital image of a mailing label, envelope, address book entry, etc. The digital image is displayed in the camera display device 108. Software elements 220 may include optical character recognition routines that are applied to the digital image to result in text or other data that may be stored as a current address and used in image development and forwarding services.

Referring again to FIG. 12B, in block 1215, the process includes choosing the size and quantity of prints to be prepared. For example, a user specifies that a certain number of 8×10 prints are to be made.

Figure 10:
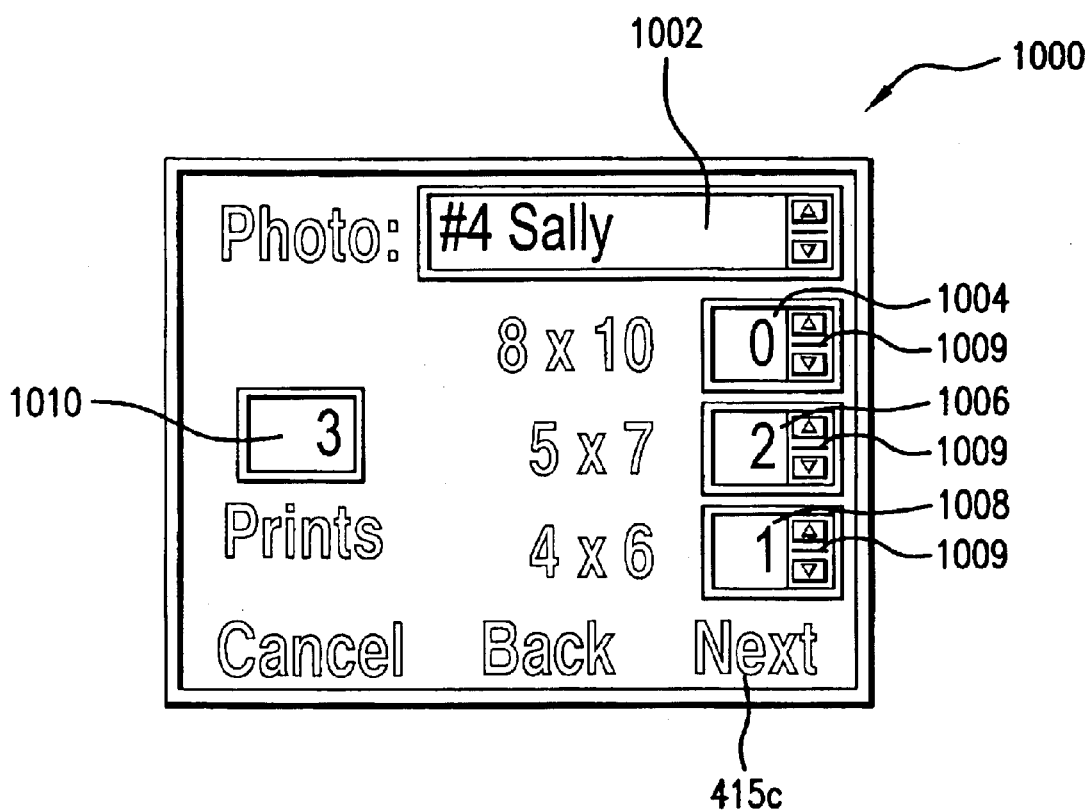
FIG. 10 is a diagram of a developing option selection screen generating during a development process, according to an embodiment.

FIG. 10 is a diagram of a selection screen 1000 that may be displayed by camera 100 as part of block 1215. Selection screen 1000 includes an image identifier field 1002 that displays the name or other identifier of one or more images. In the example of FIG. 10, field 1002 displays the name of the fourth image stored in the camera, which is named "Sally." Selection screen 1000 may also include one or more size selection fields 1004, 1006, and 1008 in which the user may enter the desired quantity of a particular size of photographic prints. Each size selection field 1004, 1006, and 1008 is associated with a different standard photographic print size, such as 8×10, 5×7, 4×6, etc. Each size selection field 1004, 1006, and 1008 accepts a numeric entry, and may include up and down single-step buttons 1009 that may be used to increase or decrease the numeric entry by integer values of "1." The particular format and mechanics of the user interface are not critical. Any mechanism for entering a quantity of a particular type of print may be used in addition or alternatively. A total number of requested prints, computed from the values entered in the size selection fields 1004, 1006, and 1008, can be included in a total print number field 1010.

Selection screen 1000 may also include a price field (not shown) that displays a price value representing the cost to the user of camera 100 of preparing and sending the desired quantity of photographic prints. The price value displayed in the price field may be computed and displayed by software elements 220 based on a table of prices stored in the camera or otherwise accessible to the camera. In an embodiment, the table of prices may be updated with new prices in subsequent steps of the process of FIG. 12B when an image is sent for development. Thus, camera 100 may be updated periodically to acquire new price values as processing prices change. To indicate that the displayed price value is acceptable, the user may select the NEXT option 415c.

In block 1216, a confirmation screen is displayed by the camera 100 on its display. For example, camera 100 may display a screen that states "Canoe image will be sent to grandma@hometown.com." The confirmation screen may also include the quantities and sizes of prints that were selected in block 1215, as well as the cost. Alternatively, addressing screen 963 of FIG. 9D may serve as a confirmation screen.

In block 1218 of FIG. 12B, a send option is selected. In one embodiment, the user may select whether to send the current image to the service provider immediately, or the user may select delayed sending. In the case of delayed sending, information about the current image and the prints desired is stored in an Out Box for later delivery at a scheduled time. The Out Box is a storage area within the non-volatile memory of camera 100 that stores one or more images and information that defines how the images should be printed by the photo service provider.

Figure 12C:
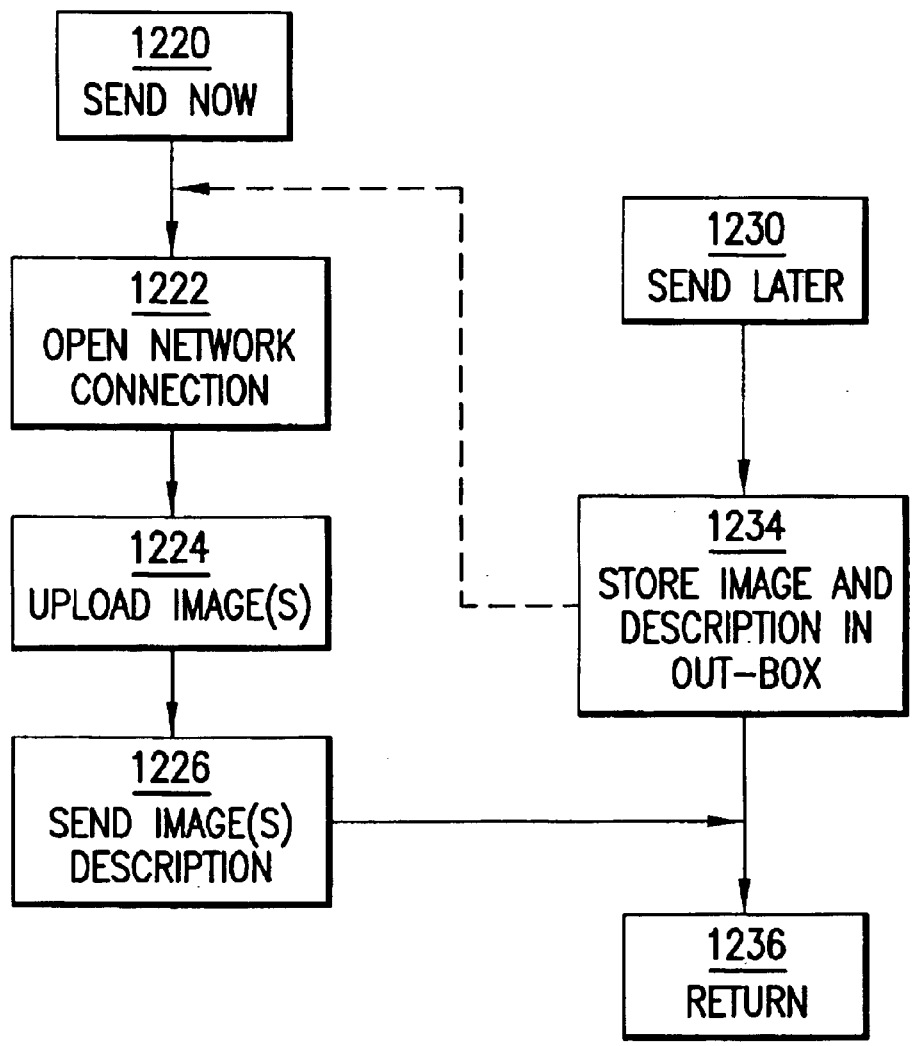
FIG. 12C is a flow diagram of steps in a process of image transport.

FIG. 12C is a flow diagram of a process of sending an image for development and printing. In an embodiment, block 1218 involves carrying out the steps of FIG. 12C.

Block 1220 indicates that a SEND NOW option has been selected using software elements of camera 100. In block 1222, camera 100 opens a network connection to server 801. This may involve: prompting the user to connect a cable between modem 214 of the camera 100 and a telephone line that is coupled to network 806; automatically dialing a pre-defined telephone number that is associated with modem 804; and carrying out handshaking or other communications between modem 214 and modem 804.

In block 1224, the current image is uploaded from camera 100 to server 801. This may involve carrying out an FTP transfer of the current image between an FTP server running in and executed by server 801, and an FTP client running in and executed by camera 100. The FTP client may be one of the software elements 220. Block 1224 may also involve communicating information from the camera 100 to server 801 that defines how the image is to be printed. For example, the information may include the size and quantity of prints, the expected charge, and a third party recipient or addressee to whom the prints are to be delivered.

In block 1226, services are carried out by the photo service provider with respect to the current image. Block 1226 may involve: interpreting the information that defines how the image is to be printed and creating one or more commands for photographic printing machine 840; forwarding the current image to the photographic printing machine 840 with the commands; generating a photographic print at photographic printing machine 840; and delivering the photographic print to the recipient. The delivery may be automatic; for example, the photographic print may be automatically stuffed into an envelope to which an automatically-generated mailing label is applied. Such services may be carried out by software elements associated with or executed by server 810 in cooperation with database 830 and cooperative software elements of photographic printing machine 840.

In one embodiment, server 810 includes an HTTP server that can communicate with clients that are equipped with browser software. Thus, a customer of the service provider that is providing services 802 may browse the customer's account with a Web browser. For example, the customer can use the browser to connect to the HTTP server of the service provider, log in using a pre-determined user name and password, and view images that the customer has sent to the service provider from the customer's camera 100 using the mechanisms outline above. In addition or alternatively, the customer can order reprints or other products incorporating an image or images, such as calendars, t-shirts, etc. The browser may be among software elements 220.

Software elements 220 may use smart dialing to establish a connection from modem 214 to modem 804. For example, the software elements go off hook and dial a pre-selected number of service provider 800. If error tone or fast busy tone is received, software elements 220 go on hook, then go off hook and dial a "9" as a prefix digit. Other combinations of prefix digits, such as "8", "9-1", "8-1 ", etc., may be attempted separately or successively.

Block 1230 indicates that the SEND LATER or "Out Box" sending method has been selected. In block 1232, a delayed sending time is entered. Block 1232 may involve displaying a prompt on the display device of camera 100 that requests entry of a day and time at which the current image is to be sent to the photo service provider. The day and time values may be entered using a virtual keyboard.

In block 1234, the day and time values are stored in association with the image in an Out Box of the digital camera. Block 1234 may also involve initiating an alarm process or daemon that periodically compares the current time, as determined by a clock within the digital camera, to the day and time values. When the day and time specified by the day and time values arrive, as indicated by arrow 1235 of FIG. 12C, the image is sent to the photo service provider using the method described above.

In one embodiment, transfers of digital images between camera 100 and server 810 use data compression techniques to reduce the size of the digital image file that is transferred over the networks. For example, wavelet compression may be used. Suitable wavelet compression software is available from TeraLogic and MediaMotion, Inc.

ALTERNATIVES AND EXTENSIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preparing a photographic print, the method comprising the steps of:
    forming a digital image in a digital camera;
    retrieving one or more address images;
    communicating the digital image and the one or more address images from the digital camera over one or more networks to a service provider that is remote from the digital camera and coupled to one of the networks;
    printing a photographic print of the digital image on a photographic printer associated with the service provider; and
    delivering the photographic print from the service provider to one or more receiving parties specified by the one or more address images.

2. The method as recited in claim 1, wherein the step of retrieving one or more address images includes retrieving one or more address images from a location remote from the digital camera.

3. The method as recited in claim 1, wherein the step of retrieving one or more address images includes forming one or more address images in the digital camera.

4. The method as recited in claim 1, further comprising forming and storing the one or more address images.

5. The method as recited in claim 4, further comprising creating and storing the one or more address images by displaying a virtual keyboard on a display of the digital camera, and
    receiving address information specified by the one or more address images in the form of characters selected using the virtual keyboard.

6. The method as recited in claim 4, further comprising creating and storing the one or more address images by
    storing, in the digital camera, a list of previously defined receiving parties;
    displaying the list in a display device of the digital camera;
    receiving a selection of one of the receiving parties from the list, and
    storing information identifying the selected receiving party in association with the digital image.

7. The method as recited in claim 1, wherein the one or more address images specify the names and addresses of one or more receiving parties.

8. The method as recited in claim 1, further comprising creating and storing, in the digital camera in association with the digital image, one or more instructions that define how to print the digital image at the service provider, and
    printing the photographic print at the service provider according to the instructions.

9. The method as recited in claim 8, further comprising computing and displaying in the digital camera a price value that defines a price charged by the service provider for printing and delivering the photographic print according to the instructions.

10. The method recited as in claim 8, wherein creating and storing one or more instructions that define how to print the digital image at the service provider includes creating and storing, in association with the digital image, one or more instructions that define a quantity and size of the photographic print.

11. The method as recited in claim 10, further comprising computing and displaying in the digital camera a price value that defines a price charged by the service provider for printing and delivering the photographic print according to the instructions.

12. The method as recited in claim 1, further comprising
    selecting whether to communicate the digital image from the digital camera to the service provider immediately or at a later time;
    storing the digital image in the digital camera in association with information identifying the later time; and
    at the later time, communicating the digital image from the digital camera to the service provider.

13. A method of preparing a photographic print, comprising the steps of:
    forming a digital image using a digital camera;
    storing, in the digital camera in association with the image, address information that specifies one or more recipients of the digital image and that defines characteristics of the photographic print;
    communicating both the digital image and the address information over a packet-switched data network to a service provider that is logically remote from the digital camera and communicatively coupled to the data network;
    printing a photographic print from the digital image based on the characteristics; and then
    delivering the photographic print to the one or more recipients specified by the address information.

14. The method as recited in claim 13, further comprising storing the digital image at a server computer of the service provider in an account that is uniquely associated with the digital camera or its owner.

15. The method as recited in claim 13, further comprising:
    storing and executing in the digital camera, a file transfer protocol (FTP) client program;
    storing and executing, in a server computer associated with the service provider, an FTP server program; and
    carrying out the communicating step by uploading the digital image from the digital camera to the service provider using FTP.

16. A computer-readable medium carrying one or more sequences of one or more instructions for preparing a photographic print, the one or more sequences of one or more instructions including instructions which, when executed by one or more processors, cause the one or more processors to perform the steps of:
    forming a digital image in a digital camera;
    retrieving one or more address images;
    communicating the digital image and the one or more address images from the digital camera over one or more networks to a service provider that is remote from the digital camera and coupled to one of the networks;

printing a photographic print of the digital image on a photographic printer associated with the service provider; and delivering the photographic print from the service provider to one or more receiving parties specified by the one or more address images.

17. A computer-readable medium as recited in claim 16, wherein the step of retrieving one or more address images includes retrieving one or more address images from a location remote from the digital camera.

18. A computer-readable medium as recited in claim 16, wherein the step of retrieving one or more address images includes forming one or more address images in the digital camera.

19. A computer-readable medium as recited in claim 16, further comprising one or more instructions which, when executed by the one or more processors, cause the one or more processors to form and store the one or more address images.

20. A computer-readable medium as recited in claim 19, further comprising one or more instructions which, when executed by the one or more processors, cause the one or more processors to
   create and store the one or more address images by displaying a virtual keyboard on a display of the digital camera, and
   receive address information specified by the one or more address images in the form of characters selected using the virtual keyboard.

21. A computer-readable medium as recited in claim 19, further comprising one or more instructions which, when executed by the one or more processors, cause the one or more processors to create and store the one or more address images by:
   storing, in the digital camera, a list of previously defined receiving parties;
   displaying the list in a display device of the digital camera;
   receiving a selection of one of the receiving parties from the list,; and
   storing information identifying the selected receiving party in association with the digital image.

22. A computer-readable medium as recited in claim 16, wherein the one or more address images specify the names and addresses of one or more receiving parties.

23. A computer-readable medium as recited in claim 16, further comprising one or more instructions which, when executed by the one or more processors, cause the one or more processors to
   create and store, in the digital camera in association with the digital image, one or more instructions that define how to print the digital image at the service provider, and
   print the photographic print at the service provider according to the instructions.

24. A computer-readable medium as recited in claim 23, further comprising one or more instructions which, when executed by the one or more processors, cause the one or more processors to compute and display in the digital camera a price value that defines a price charged by the service provider for printing and delivering the photographic print according to the instructions.

25. A computer-readable medium recited as in claim 23, wherein creating and storing one or more instructions that define how to print the digital image at the service provider includes creating and storing, in association with the digital image, one or more instructions that define a quantity and size of the photographic print.

26. A computer-readable medium as recited in claim 25, further comprising one or more instructions which, when executed by the one or more processors, cause the one or more processors to compute and display in the digital camera a price value that defines a price charged by the service provider for printing and delivering the photographic print according to the instructions.

27. A computer-readable medium as recited in claim 16, further comprising one or more instructions which, when executed by the one or more processors, cause the one or more processors to:
   select whether to communicate the digital image from the digital camera to the service provider immediately or at a later time;
   store the digital image in the digital camera in association with information identifying the later time; and
   at the later time, communicate the digital image from the digital camera to the service provider.

28. A digital camera configured to:
   form a digital image;
   retrieve one or more address images; and
   communicate the digital image and the one or more address images from the digital camera over one or more networks to a service provider that is remote from the digital camera and coupled to one of the networks.

29. The digital camera as recited in claim 28, further configured to retrieve one or more address images from a location remote from the digital camera.

30. The digital camera as recited in claim 28, further configured to form one or more address images in the digital camera.

31. The digital camera as recited in claim 28, further configured to form and store the one or more address images.

32. The digital camera as recited in claim 31, further configured to create the one or more address images by
   displaying a virtual keyboard on a display of the digital camera, and
   receiving address information specified by the one or more address images in the form of characters selected using the virtual keyboard.

33. The digital camera as recited in claim 31, further configured to create and store the one or more address images by
   storing, in the digital camera, a list of previously defined receiving parties,
   displaying the list in a display device of the digital camera,
   receiving a selection of one of the receiving parties from the list, and
   storing information identifying the selected receiving party in association with the digital image.

34. The digital camera as recited in claim 28, wherein the one or more address images specify the names and addresses of one or more receiving parties.

35. The digital camera as recited in claim 28, further configured to create and store, in the digital camera in association with the digital image, one or more instructions that instruct the service provider on how to print a photographic print of the digital image.

36. The digital camera as recited in claim 35, further configured to compute and display in the digital camera a price value that defines a price charged by the service provider.

37. The digital camera recited as in claim 35, further configured to create and store, in association with the digital image, one or more instructions that define a quantity and size of the photographic print.

38. The digital camera as recited in claim 37, further configured to compute and display in the digital camera a price value that defines a price charged by the service provider.

39. The digital camera as recited in claim 28, further configured to:

select whether to communicate the digital image from the digital camera to the service provider immediately or at a later time;

store the digital image in the digital camera in association with information identifying the later time; and at the later time, communicate the digital image from the digital camera to the service provider.

* * * * *